US012613523B2

(12) United States Patent
Hori et al.

(10) Patent No.: US 12,613,523 B2
(45) Date of Patent: Apr. 28, 2026

(54) METHOD AND SYSTEM FOR GENERATING A SEQUENCE OF ACTIONS FOR CONTROLLING A ROBOT

(71) Applicant: Mitsubishi Electric Research Laboratories, Inc., Cambridge, MA (US)

(72) Inventors: Chiori Hori, Lexington, MA (US); Jonathan Le Roux, Arlington, MA (US); Devesh Jha, Cambridge, MA (US); Siddarth Jain, Cambridge, MA (US); Radu Ioan Corcodel, Cambridge, MA (US); Diego Romeres, Boston, MA (US); Puyuang Peng, Austin, TX (US); Xinyu Liu, Province, RI (US); David Harwath, Austin, TX (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 289 days.

(21) Appl. No.: 18/475,442

(22) Filed: Sep. 27, 2023

(65) Prior Publication Data

US 2024/0288870 A1 Aug. 29, 2024

Related U.S. Application Data

(60) Provisional application No. 63/447,658, filed on Feb. 23, 2023.

(51) Int. Cl.
| | |
|---|---|
| *G05D 1/00* | (2024.01) |
| *G06V 10/82* | (2022.01) |

(Continued)

(52) U.S. Cl.
CPC ............ *G05D 1/0246* (2013.01); *G06V 10/82* (2022.01); *G06V 20/41* (2022.01); *G06V 20/46* (2022.01);

(Continued)

(58) Field of Classification Search
CPC ..... G10L 15/16; G10L 15/1815; G10L 25/30; G10L 15/02; B25J 9/163; G06N 3/045;

(Continued)

(56) References Cited

U.S. PATENT DOCUMENTS

| | | | |
|---|---|---|---|
| 1,087,233 A | 2/1914 | Hedrick et al. | |
| 2024/0375279 A1* | 11/2024 | Tsai | B25J 9/163 |

FOREIGN PATENT DOCUMENTS

| | | | | |
|---|---|---|---|---|
| WO | WO-2021069129 A1 * | 4/2021 | | B25J 9/163 |
| WO | 2022004057 A1 | 1/2022 | | |
| WO | WO-2023122132 A2 * | 6/2023 | | H04N 19/70 |

OTHER PUBLICATIONS

WO2021069129A1—English (Year: 2021).*

(Continued)

*Primary Examiner* — Abby Lin
*Assistant Examiner* — Renee LaRose
(74) *Attorney, Agent, or Firm* — Gene Vinokur

(57) ABSTRACT

A method, a system and a computer program product are provided for applying a neural network including an action sequence decoder for generating an action sequence for a robot to perform a task. The neural network is applied to generate the action sequence based on recordings demonstrating humans performing tasks. In an example, the method comprises collecting a recording and a sequence of captions describing scenes in the recording; extracting feature data from the recording; encoding the extracted feature data to produce a sequence of encoded features; and applying the action sequence decoder to produce a sequence of (Continued)

810 〜 actions for the robot based on the sequence of encoded features having a semantic meaning corresponding to a semantic meaning of the sequence of captions. The feature data includes features of a video signal, an audio signal, and/or text transcription capturing a performance of the task.

19 Claims, 12 Drawing Sheets

(51) Int. Cl.

| | |
|---|---|
| *G06V 20/40* | (2022.01) |
| *G10L 15/02* | (2006.01) |
| *G10L 15/16* | (2006.01) |
| *G10L 15/18* | (2013.01) |

(52) U.S. Cl.
CPC .............. *G06V 20/49* (2022.01); *G10L 15/02* (2013.01); *G10L 15/16* (2013.01); *G10L 15/1815* (2013.01)

(58) Field of Classification Search
CPC .......... G06N 20/00; G05B 2219/40116; G06F 40/30; G06V 40/20; G06V 10/82; G06V 20/41; G06V 20/46; G06V 20/49; G05D 1/0246

See application file for complete search history.

(56) References Cited

OTHER PUBLICATIONS

2023/122132A2—english (Year: 2023).*
C. Lin, A. Zeng, S. Song, P. Isola, and T.-Y. Lin, "Learning to see before learning to act: Visual pre-training for manipulation," in Proc. ICRA, 2020, pp. 7286-7293.
M. Shridhar, L. Manuelli, and D. Fox, "Cliport: What and where pathways for robotic manipulation," in Proc. CoRL, 2021.

* cited by examiner

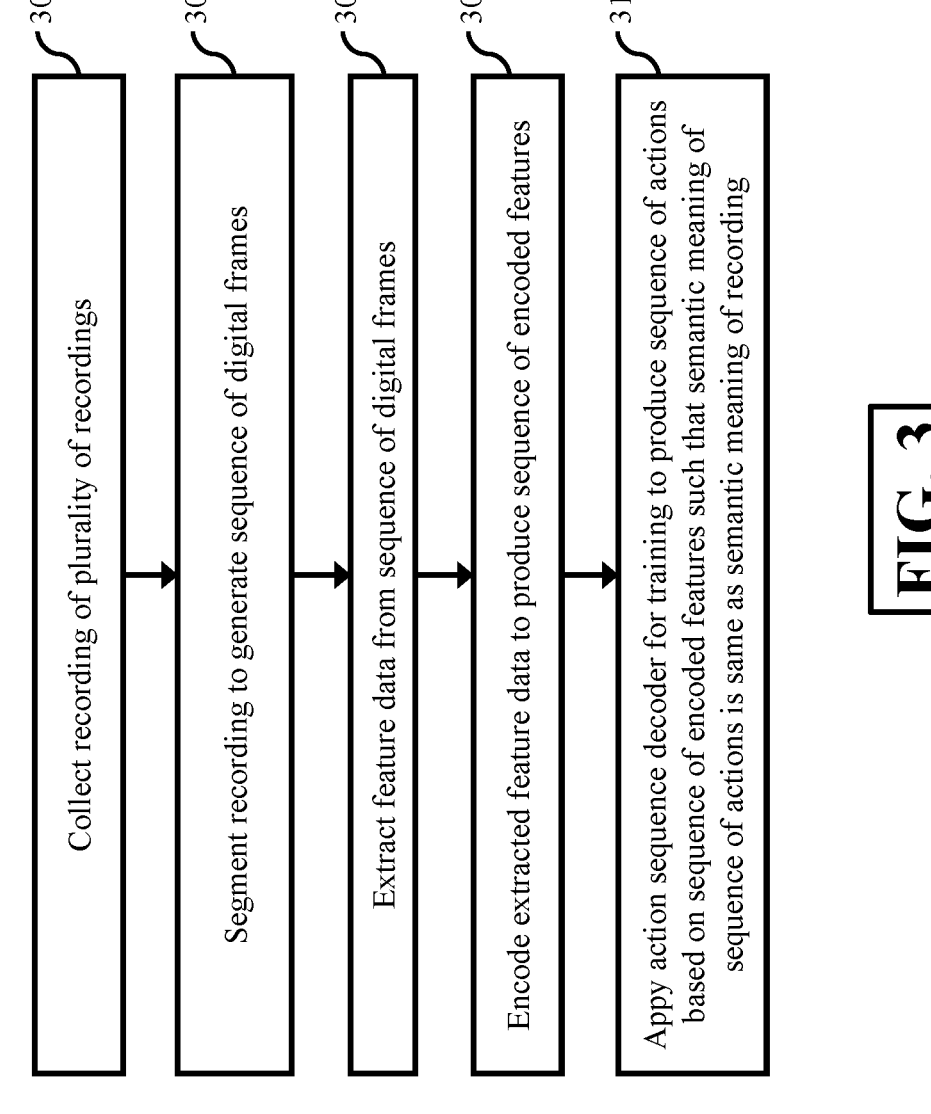

300

302 Collect recording of plurality of recordings

304 Segment recording to generate sequence of digital frames

306 Extract feature data from sequence of digital frames

308 Encode extracted feature data to produce sequence of encoded features

310 Appy action sequence decoder for training to produce sequence of actions based on sequence of encoded features such that semantic meaning of sequence of actions is same as semantic meaning of recording

FIG. 3

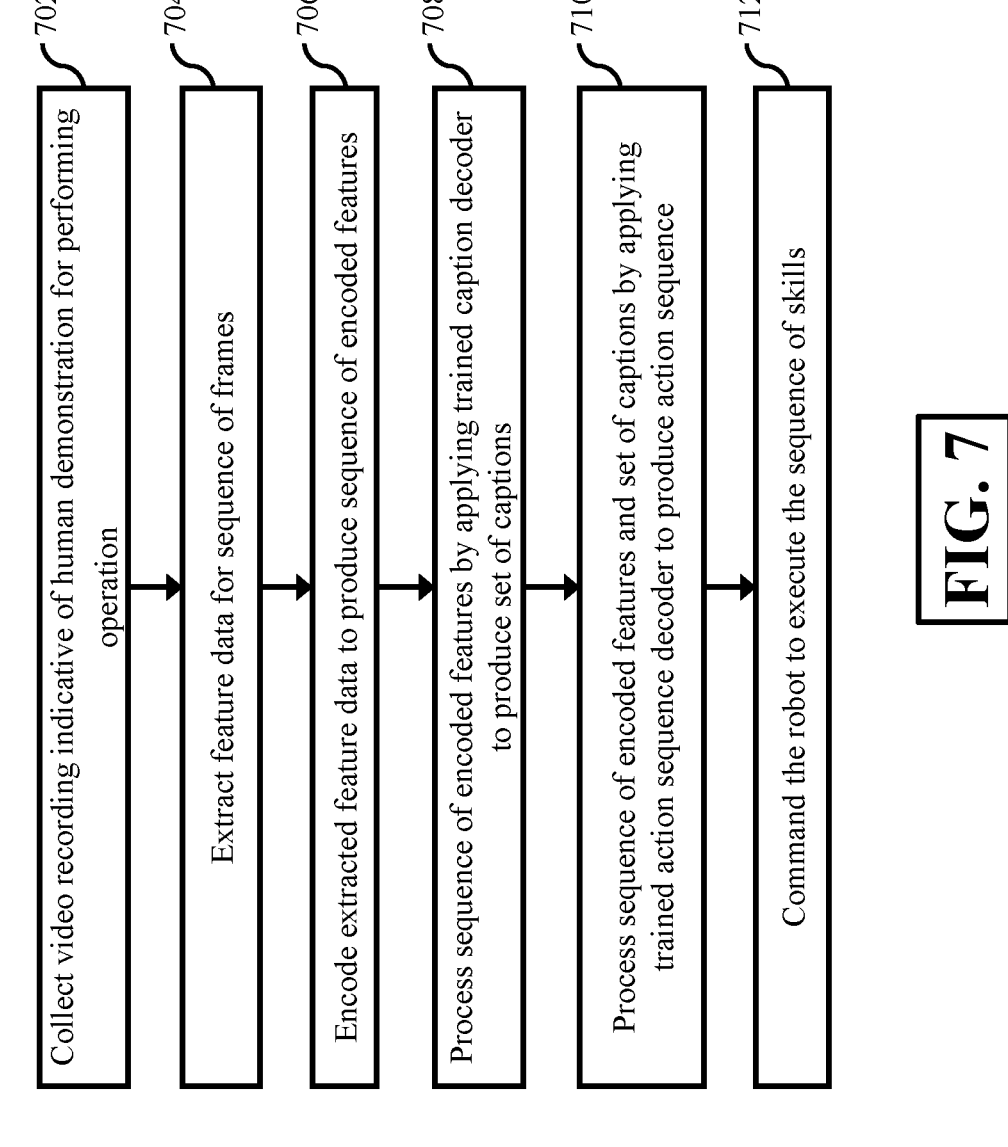

702 — Collect video recording indicative of human demonstration for performing operation 704 — Extract feature data for sequence of frames 706 — Encode extracted feature data to produce sequence of encoded features 708 — Process sequence of encoded features by applying trained caption decoder to produce set of captions 710 — Process sequence of encoded features and set of captions by applying trained action sequence decoder to produce action sequence 712 — Command the robot to execute the sequence of skills

METHOD AND SYSTEM FOR GENERATING A SEQUENCE OF ACTIONS FOR CONTROLLING A ROBOT

TECHNICAL FIELD

The disclosure relates generally to robot control, and more particularly to applying a neural network to generate a sequence of actions based on audio and/or video instructions.

BACKGROUND

In recent years, there has been a growing interest in developing robots capable of performing complex tasks autonomously. Traditionally, robot controlling involved explicit programming and manual intervention, which limited their adaptability and restricted their functionality to predefined tasks. However, recent advancements in machine learning, computer vision, and artificial intelligence have paved the way for new approaches to robot controlling, making it possible to control robots using visual information extracted from videos.

The applications of robot controlling and manipulating their environment are immense, such as in hospitals, elderly and childcare, factories, outer space, restaurants, service industries, and homes. Such a wide variety of deployment scenarios, and the pervasive and unsystematic environmental variations in even quite specialized scenarios like food preparation, suggest that there is a need for rapid training of a robot for effective control. A number of methods have focused on the question of how a robot should learn to manipulate the world around it. At a high level, several works on robotic manipulation actions have proposed how instructions can be stored and analyzed.

Existing techniques in machine learning training and robot controlling involve a combination of supervised and reinforcement learning methods. Such methods often require significant human intervention and rely on expert knowledge to design handcrafted features and create large-scale datasets for training. However, these methods are very laborious, time-consuming, and/or resource intensive. Moreover, they suffer from limitations such as high computational complexity, poor generalization, and lack of scalability.

SUMMARY

A method, a system and a computer program product are provided herein that focuses on applying a neural network for generating an action sequence for a robot to perform a task based on audio and/or video instructions.

It is an objective of some embodiments of the present disclosure to collect recordings capturing information indicative of a human demonstration for performing a task. It is another object of some embodiments of the present disclosure to provide a method to apply an action sequence decoder of the neural network for generating an action sequence using the recordings. It is yet another object of some embodiments of the present disclosure to extract feature data from the recordings. It is an object of some embodiments of the present disclosure to use a trained action sequence decoder of the neural network to transform feature data into a sequence of actions for a robot and command the robot to execute the sequence of actions to perform the task.

It is an objective of some embodiments of the present disclosure to provide a novel training process for applying the action sequence decoder.

Some embodiments are based on an understanding that a robot may be trained to learn a new skill from recordings. In this regard, several techniques have proposed how instructions from recordings may be stored and analyzed. Certain methods may utilize contrastive learning to learn a reward function to train reinforcement learning (RL) agents. For example, RL may be used to train the robot to learn how to perform a new task in an effective manner. However, for learning the new task for robot manipulation, a number of actions are virtually unbounded, while the RL expects a selection from a finite set of actions. Therefore, such RL agents may fail to achieve high accuracy in performing new tasks based on previous learning.

Typically, learning robots' commands from human demonstration can be seen as a learning problem. To that end, various action-oriented techniques, such as reinforcement learning can be used to perform such learning. However, some embodiments are based on a realization that training robots from human demonstration can be seen as a translation problem from one abstract-level representation used by humans to another abstract-level representation used by robots. Examples of abstract-level representation used by humans are video, audio, and/or text representation of the instructions. Examples of abstract-level representation used by robots include DMPs. However, regardless of the examples of the abstract-level representation, such a translation can be seen as a sequence-to-sequence mapping between a set of symbols of the human abstract-level representation and a set of symbols of the robot abstract-level representation. Such a translation can be done using an attention mechanism, such as a neural network having a transformer architecture and trained for the transcription of audio-visual scenes.

Certain other methods may use robot primitives and extraction of cost functions from human demonstration recordings to enable imitation of demonstrated tasks. In such a case, perception modules may be trained on large sets of manipulation data to simplify the learning of manipulation tasks. Some other conventional methods may use hierarchical learning, curriculum learning, and option framework. These conventional methods learn more complicated tasks from a set of previously learned less complicated tasks. However, this makes the goal of the new task more complicated, rather than performing the new task.

Some embodiments of the present disclosure are based on a realization that a major goal of human-machine interaction is to develop scene-aware interaction technologies that may allow machines or robots to interact with humans based on shared knowledge obtained through recognizing and understanding their surroundings using various kinds of sensors.

Some embodiments of the present disclosure are based on a realization that a robot may be modified to learn and reuse existing task-agnostic skills to get trained to learn a new skill or a new action sequence for performing a new task. In particular, reusing the existing task-agnostic skills allows to replace learning a new skill objective with a selection objective. In addition, reusing the existing task-agnostic skills allows distancing from specifics of the new task to mimic only effects or actions of the new task. Additionally, or alternatively, reusing the existing task-agnostic skills allows to adaptively select skills in real time to consider possible disturbances and the nature of the new task.

Some embodiments are based on a recognition that if robots had similar kinematics to humans, the robots could mimic human actions by following the trajectory of these actions in a straightforward manner. However, robots typically have very different kinematics, and it is thus difficult in practice to transfer a wide variety of human actions to robot actions by just mimicking them. However, in contrast to robots, humans share knowledge using natural language, an abstract-level representation, and they can understand each other because they share similar experiences. To this end, human students may achieve goals by mimicking teacher actions or manipulating target objects differently as long as they get the exact same status as the teacher's results.

It is an object of some embodiments of the present disclosure to apply scene-understanding technologies or scene-aware interaction framework to task-oriented planning using human recordings to teach human common knowledge to robots. This may facilitate human-robot collaboration to achieve task-oriented goals.

To realize human-robot collaboration, robots may need to execute actions for a new task according to human instructions given finite prior knowledge. To make robots perform actions to achieve new tasks, humans may share or demonstrate their knowledge of how to perform a new task with the robot through multi-modal recordings. The multi-modal recordings may include video, speech, text, and/or other command interfaces showing a sequence of short-horizon steps (or actions) to achieve a long-horizon goal (or the new task).

It is an objective of the present disclosure to achieve human-robot collaboration by applying scene-understanding technologies to task-oriented planning using human recordings, where human instructors demonstrate and explain using recording or image frames, speech and/or text what should be done in audio-visual scenes.

It is an objective of some embodiments of the present disclosure to generate relevant datasets for training an action sequence decoder using machine learning to cause a robot to perform a task. The generated relevant datasets may be used for applying or using the action sequence decoder to convert features from a recording, such as audio-visual scenes, to an action sequence of action labels.

Some embodiments disclose the machine learning to be style-transfer-based learning that includes multi-task learning with recording captioning and weakly supervised learning with a semantic classifier to generate the action sequence from the recording. The action sequence may be further transformed into robot skills, e.g., based on dynamic moment primitives (DMPs), which are then executed by robot to perform the task.

In one aspect, the present disclosure provides a method for applying a neural network including an action sequence decoder. The action sequence decoder is configured for generating a sequence of actions for a robot to perform a task. In an example, the neural network is applied to generate the sequence of actions based on a plurality of recordings demonstrating one or multiple humans performing one or multiple tasks. The method comprises collecting a recording of the plurality of recordings and a sequence of captions describing scenes in the recording, and extracting feature data from the recording. The feature data includes features of one or a combination of a video signal, an audio signal, and text transcription capturing a performance of the task. The method further comprises encoding the extracted feature data to produce a sequence of encoded features and applying the action sequence decoder to produce the sequence of actions for the robot based on the sequence of encoded features having a semantic meaning corresponding to a semantic meaning of the sequence of captions describing scenes in the recoding. The encoding may be performed using one or a combination of a video encoder, an audio encoder, and a text encoder.

According to additional method embodiments, applying the action sequence decoder further comprises processing the sequence of encoded features with the action sequence decoder to produce the sequence of actions for the robot, classifying the sequence of actions with a semantic classifier to produce a sequence of semantic labels for the sequence of actions, classifying the sequence of captions with the semantic classifier to produce a sequence of semantic labels for the sequence of captions, and updating parameters of the action sequence decoder to reduce differences between the sequence of semantic labels for the sequence of actions and the sequence of semantic labels for the sequence of captions.

According to additional method embodiments, the neural network includes a caption decoder configured to produce the sequence of captions for the sequence of encoded features, and a semantic classifier configured to produce a sequence of semantic labels for its inputs. Further, the applying further comprises processing the sequence of encoded features with the action sequence decoder to produce the sequence of actions for the robot, processing the sequence of encoded features with the caption decoder to produce the sequence of captions for the recording, classifying the sequence of actions with the semantic classifier to produce a sequence of semantic labels for the sequence of actions, classifying the sequence of captions with the semantic classifier to produce a sequence of semantic labels for the sequence of captions, and updating parameters of the action sequence decoder, the caption decoder, and the semantic classifier to reduce differences between the sequence of semantic labels for the sequence of actions and the sequence of semantic labels for the sequence of captions.

According to additional method embodiments, the sequence of actions is aligned with the sequence of captions to have a one-to-one correspondence between the actions and the captions.

According to additional method embodiments, the neural network is a transformer-based neural network.

According to additional method embodiments, the sequence of actions corresponds to a sequence of dynamic movement primitives (DMPs) to be executed by the robot.

According to additional method embodiments, the method further comprises segmenting the recording into a sequence of digital frames capturing information indicative of a human demonstration for performing the task.

According to additional method embodiments, the method for applying the action sequence decoder further comprises processing the sequence of encoded features with the action sequence decoder of the neural network, wherein the processing comprising computing a multi-task loss based on a comparison of the sequence of encoded features with the sequence of captions. The multi-task loss comprises a combination of an action sequence loss factor, a video caption loss factor, and a semantic classification loss factor. The method comprises applying the action sequence decoder to produce the sequence of actions for the robot based on optimization of the multi-task loss.

According to additional method embodiments, the action sequence decoder of the neural network includes an attention module trained with machine learning, and the attention module includes a multi-mode attention.

According to additional method embodiments, the action sequence loss factor comprises a cross-entropy (CE) loss.

According to additional method embodiments, the video caption loss factor comprises a cross-entropy (CE) loss.

According to additional method embodiments, the semantic classification loss factor comprises a binary cross-entropy (BCE) loss.

According to additional method embodiments, the semantic classification loss factor is based on a comparison of decoding of action sequence data from the sequence of encoded features with the sequence of captions.

According to additional method embodiments, once the action sequence decoder is trained, the method further comprises acquire a video recording and a set of captions describing scenes in the video recording for performing an operation, processing the video recording and the set of captions using the trained action sequence decoder to produce an action sequence for the robot, and control the robot based on the produced action sequence to perform the operation.

According to additional method embodiments, at least one of: the video encoder, or the audio encoder comprises self-attention layers corresponding to a plurality of modalities and cross-attention layers across the plurality of modalities to encode at least one of: the video signal and the audio signal.

According to additional method embodiments, style-transfer-based process is used for applying the action sequence decoder to produce the sequence of actions, the style-transfer-based process comprising transforming the semantic meaning of the sequence of captions describing scenes in the recording to the semantic meaning of the sequence of actions.

According to additional method embodiments, the style-transfer-based process is based on a multi-task learning process comprising at least a first task associated with applying the action sequence decoder to produce the sequence of actions and a second task associated with generation of the sequence of captions for the recording.

According to additional method embodiments, the style-transfer-based process is weakly-supervised training process.

In another aspect, a system for applying a neural network is provided. The neural network includes an action sequence decoder that is configured for generating a sequence of actions for a robot to perform a task. The neural network is applied to generate the sequence of actions based on a plurality of recordings demonstrating one or multiple humans performing one or multiple tasks. The system comprises a processor, and a memory having instructions stored thereon that cause the processor of the system to collect a recording of the plurality of recordings and a sequence of captions describing scenes in the recording, extract feature data from the recording, encode the extracted feature data to produce a sequence of encoded features, and apply the action sequence decoder to produce the sequence of actions for the robot based on the sequence of encoded features having a semantic meaning corresponding to a semantic meaning of the sequence of captions describing scenes in the recording. In an example, the feature data includes features of one or a combination of a video signal, an audio signal, and text transcription capturing a performance of the task. Moreover, the extracted feature data may be encoded with one or a combination of a video encoder, an audio encoder, and a text encoder.

In yet another aspect, the present disclosure provides a non-transitory computer-readable medium having stored thereon, computer-executable instructions that when executed by a system, cause a processor of the system to execute operations for applying a neural network including an action sequence decoder that is configured for generating a sequence of actions for a robot to perform a task. The neural network is applied to generate the sequence of actions based on a plurality of recordings demonstrating one or multiple humans performing one or multiple tasks. The operations comprise collecting a recording of the plurality of recordings and a sequence of captions describing scenes in the recording, extracting feature data from the recording, encoding the extracted feature data to produce a sequence of encoded features, and applying the action sequence decoder to produce the sequence of actions for the robot based on the sequence of encoded features having a semantic meaning corresponding to a semantic meaning of the sequence of captions describing scenes in the recording. In an example, the feature data includes features of one or a combination of a video signal, an audio signal, and text transcription capturing a performance of the task. Moreover, the extracted feature data may be encoded with one or a combination of a video encoder, an audio encoder, and a text encoder.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1A:
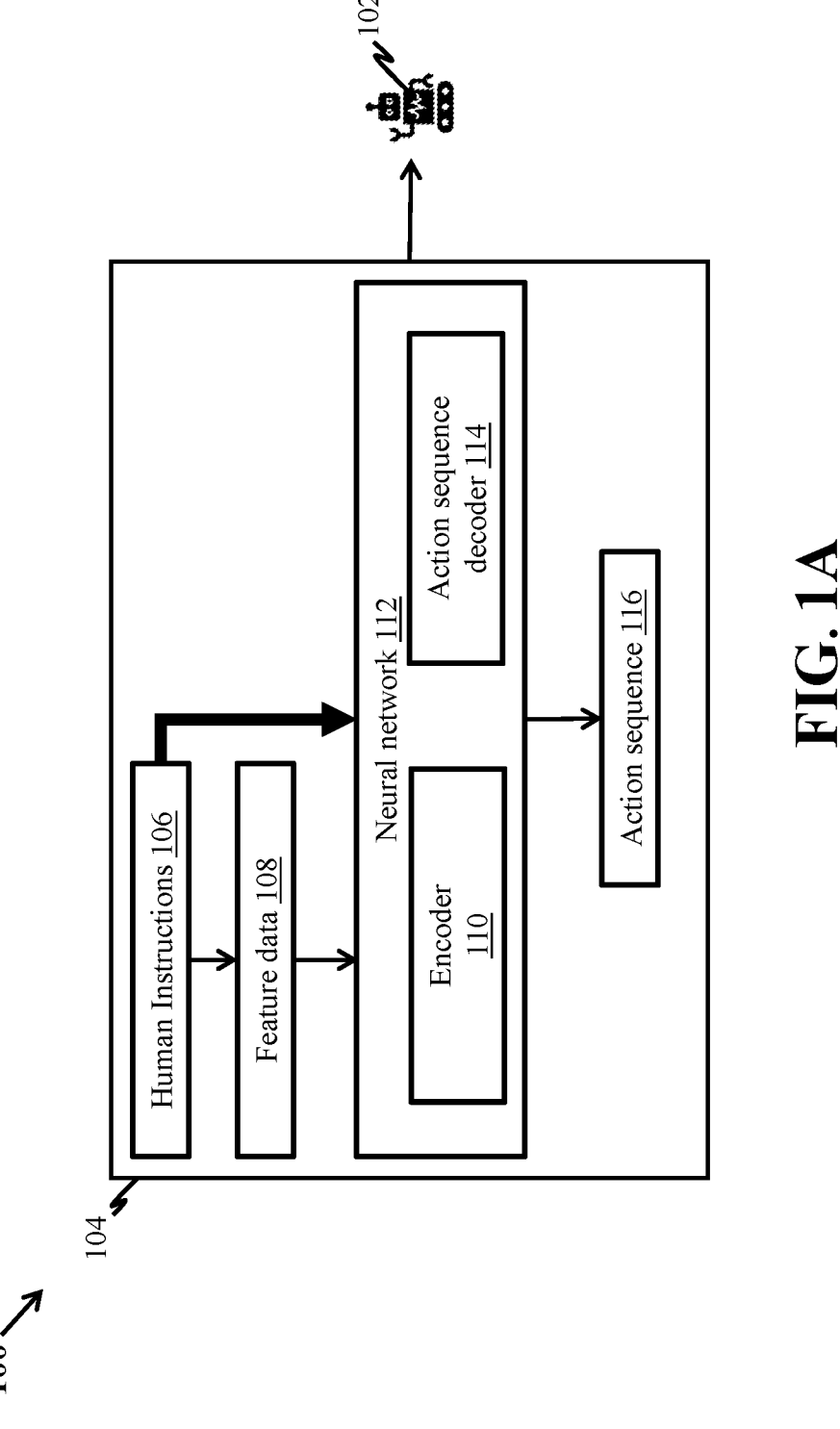

Having thus described example embodiments of the disclosure in general terms, reference will now be made to the accompanying drawings, which are not necessarily drawn to scale, and wherein:

FIG. 1A illustrates a block diagram of an exemplary network environment for controlling a robot to perform an operation, in accordance with an embodiment of the present disclosure.

Figure 1B:
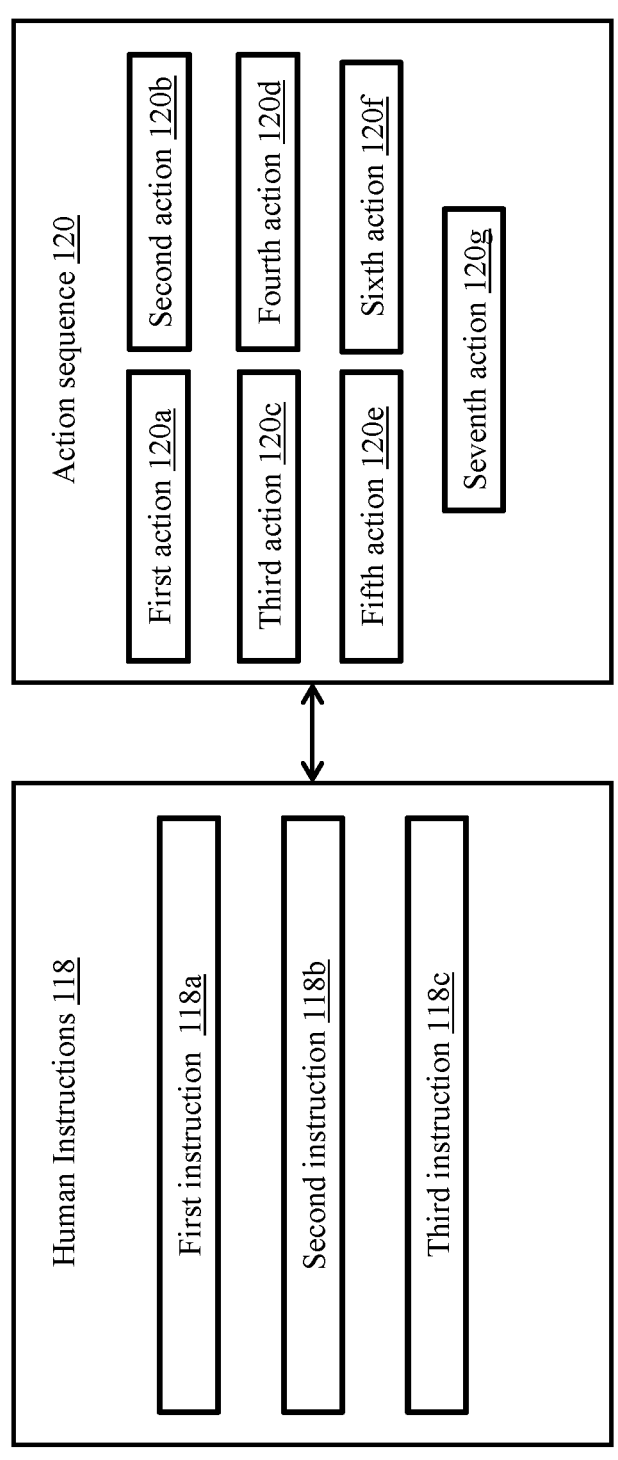

FIG. 1B illustrates a mapping between human instructions and action sequences for controlling the robot, in accordance with an embodiment of the present disclosure.

Figure 1C:
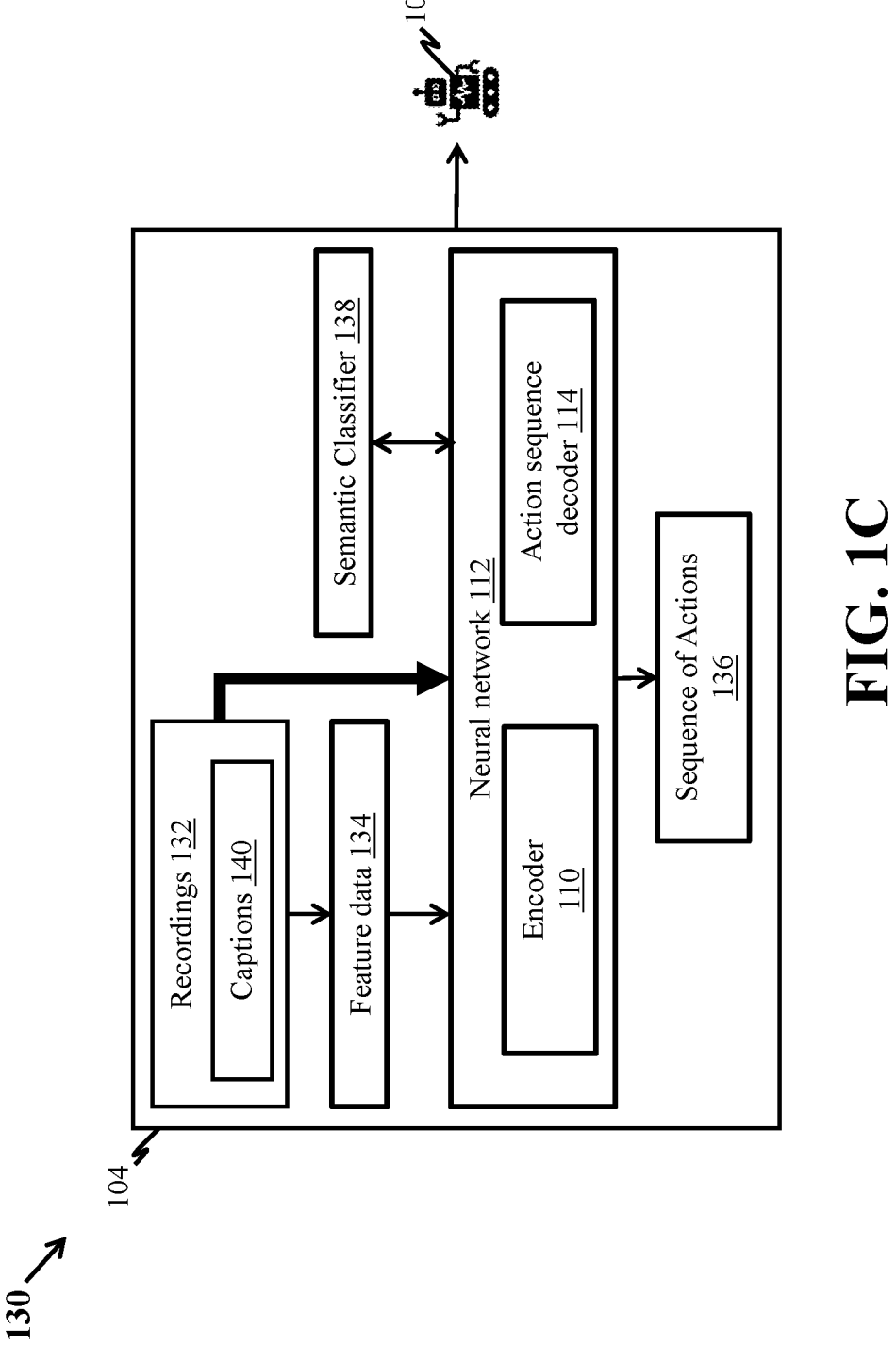

FIG. 1C illustrates a block diagram of an exemplar network environment for applying a neural network for training, in accordance with an embodiment of the present disclosure.

Figure 1D:
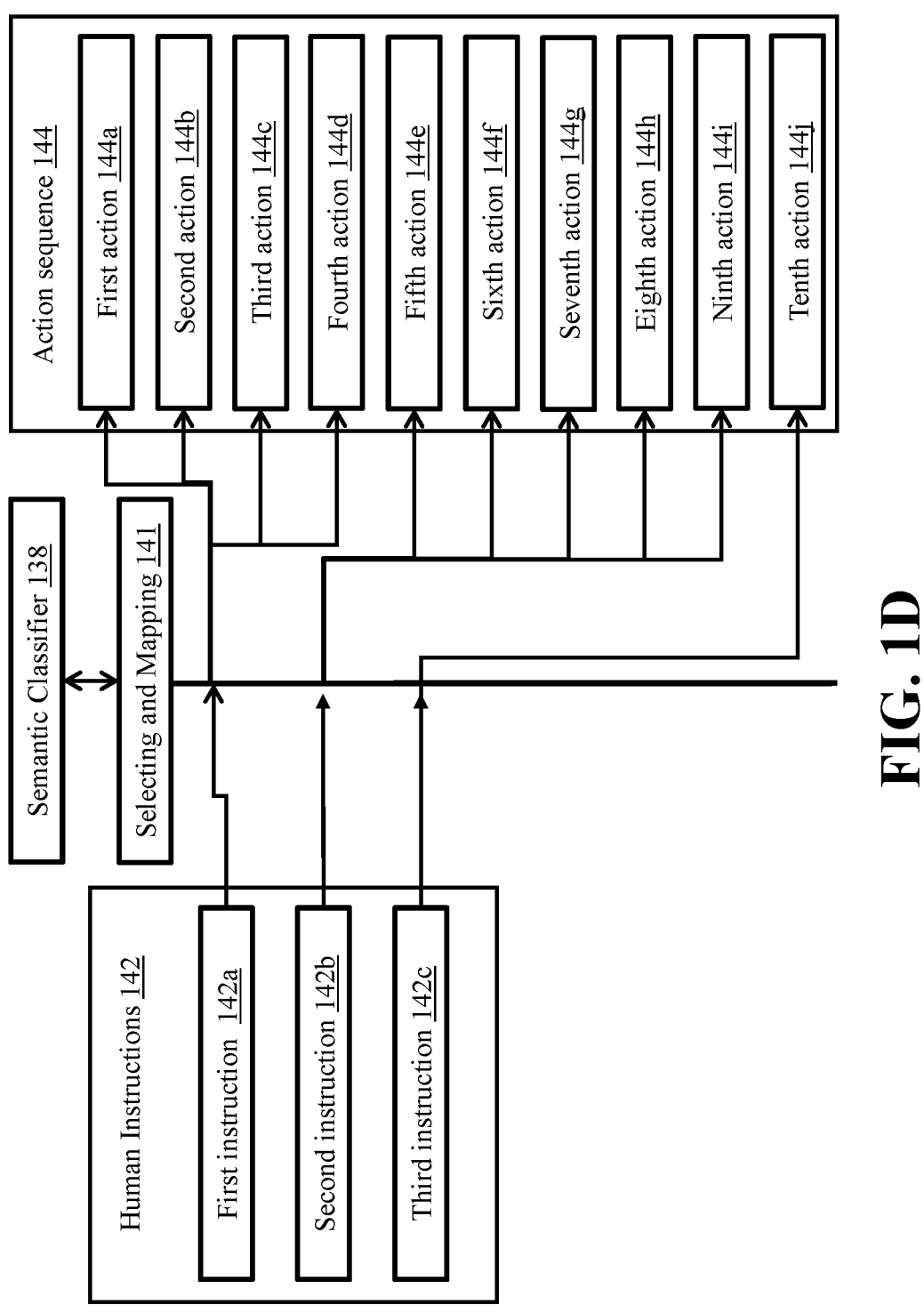

FIG. 1D illustrates a mapping between human instructions and action sequences based on semantic meaning, in accordance with an embodiment of the present disclosure.

Figure 2:
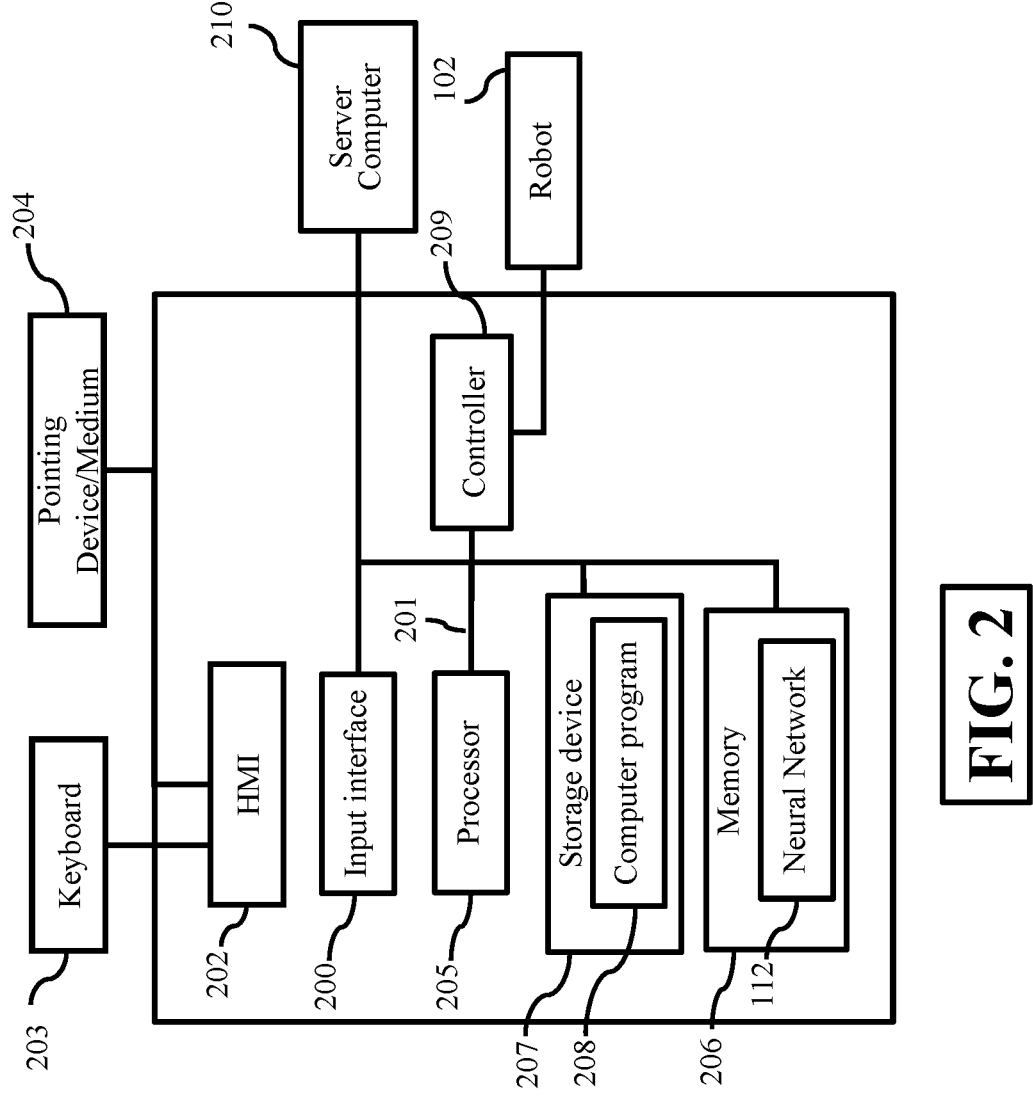

FIG. 2 illustrates a block diagram of the system for controlling the robot, according to some embodiments of the present disclosure.

FIG. 3 illustrates a flowchart of an example method for applying the neural network for training, in accordance with an embodiment of the present disclosure.

Figure 4:
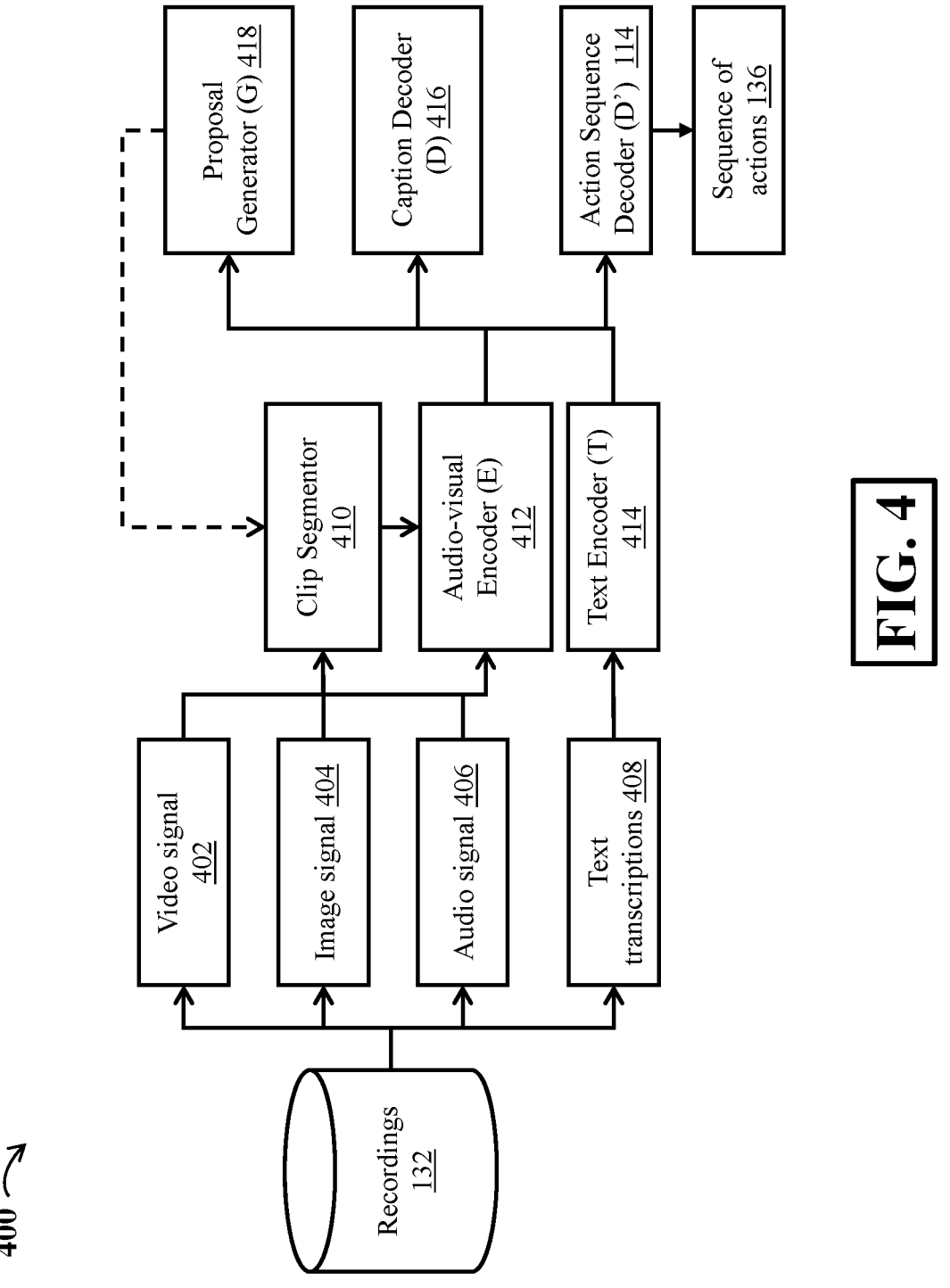

FIG. 4 illustrates a block diagram of the neural network, in accordance with an embodiment of the present disclosure.

Figure 5:
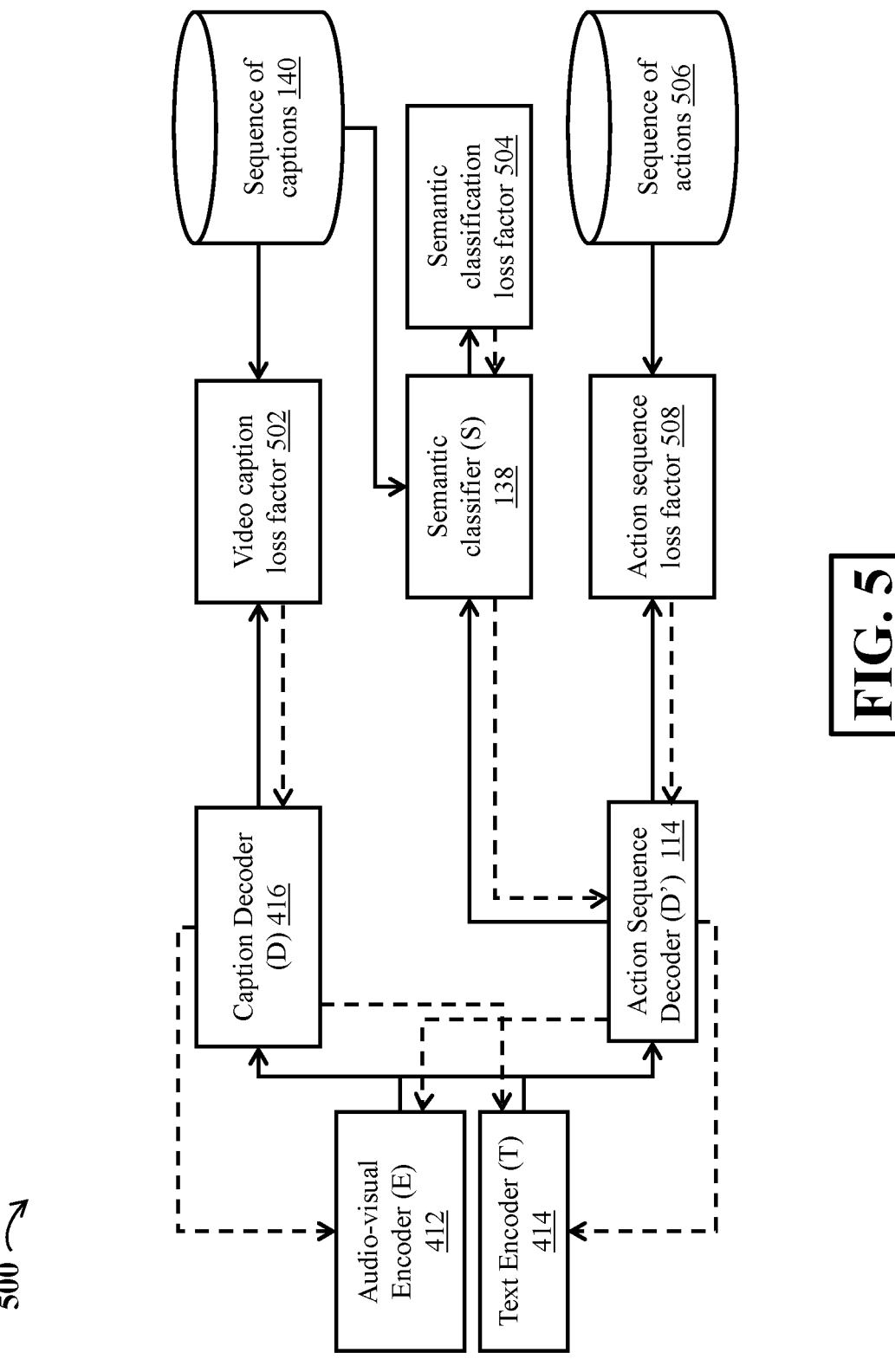

FIG. 5 illustrates a block diagram of the neural network for applying an action sequence decoder for training, in accordance with an embodiment of the present disclosure.

Figure 6:
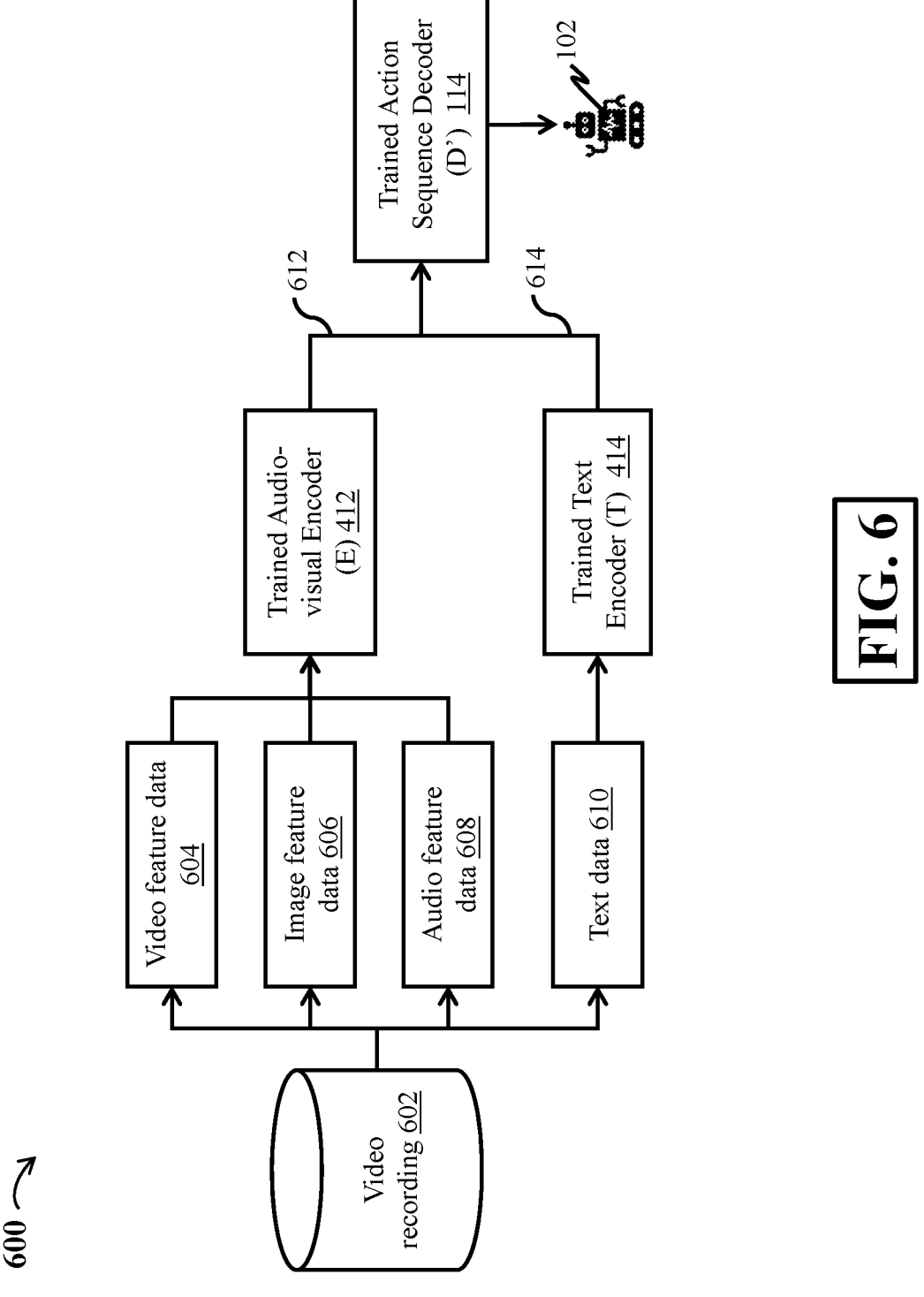

FIG. 6 illustrates a block diagram for generating an action sequence using a video recording, in accordance with an embodiment of the present disclosure.

FIG. 7 illustrates a flowchart of an example method for controlling the robot to execute an operation by generating a set of captions for the video recording, in accordance with an embodiment of the present disclosure.

Figure 8A:
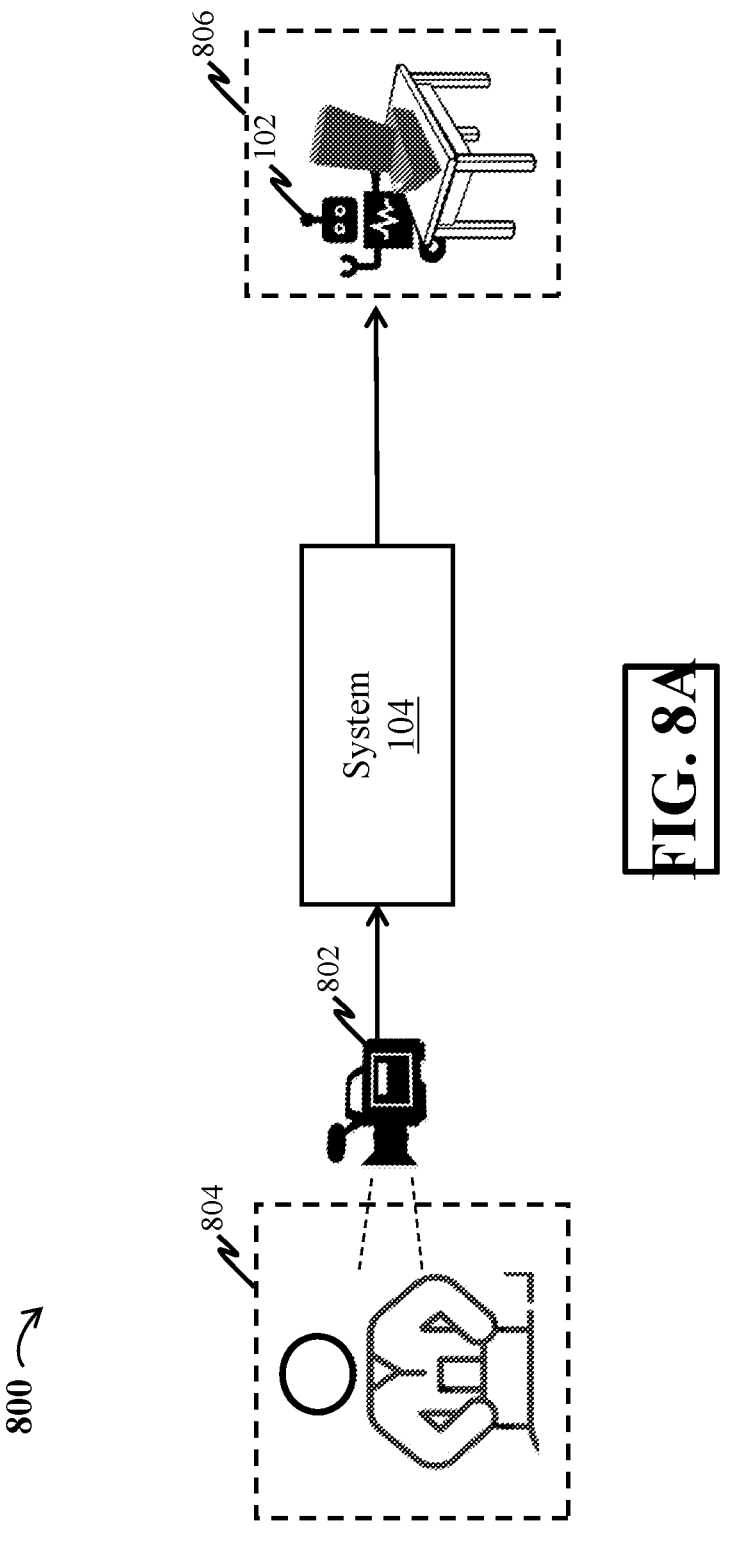

FIG. 8A illustrates a schematic diagram of execution of an assembly operation by the robot, in accordance with an embodiment of the present disclosure.

Figure 8B:
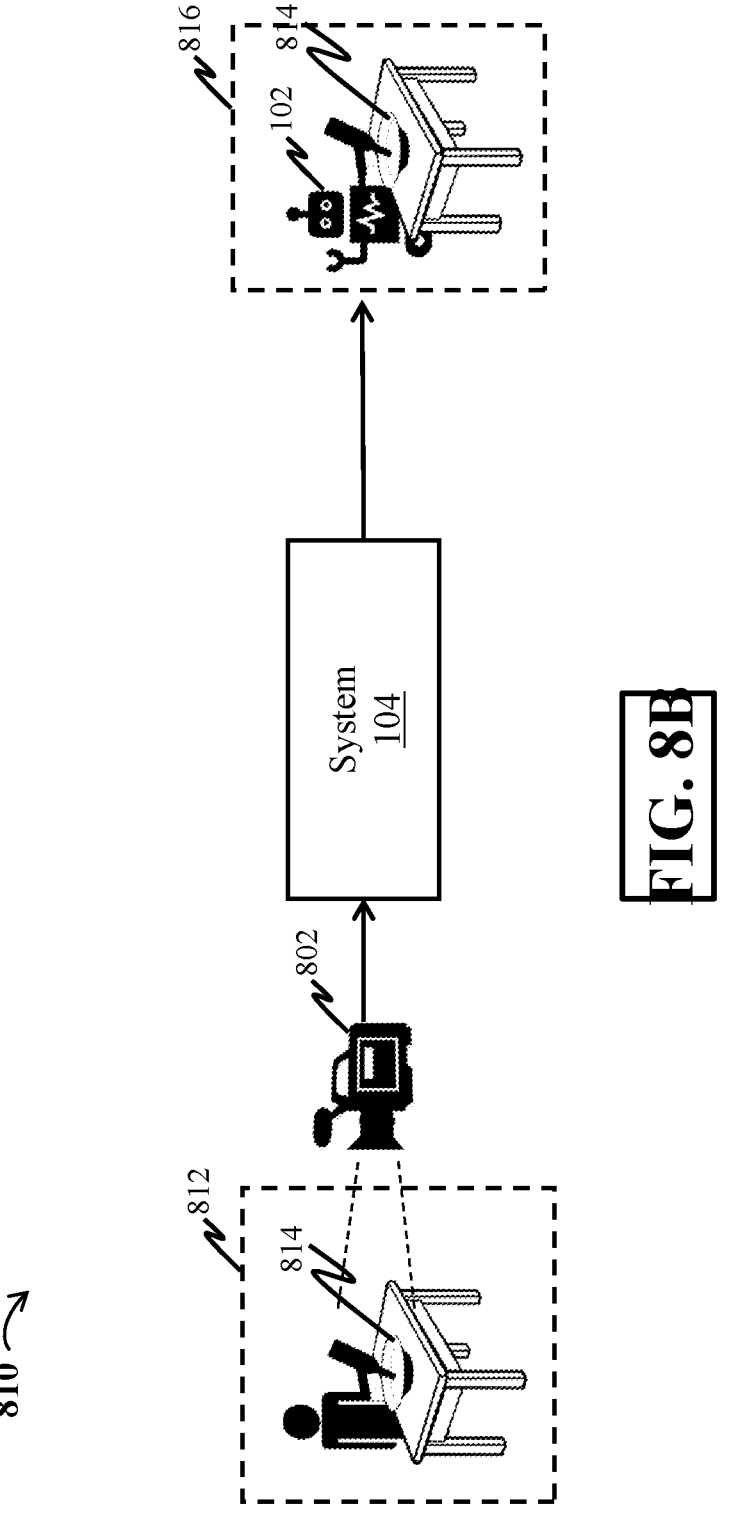

FIG. 8B illustrates a schematic diagram of execution of a cooking operation by the robot, in accordance with an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

As defined herein, a "computer-readable storage medium," which refers to a non-transitory physical storage medium (for example, volatile or non-volatile memory device), may be differentiated from a "computer-readable transmission medium," which refers to an electromagnetic signal.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

It is an object of some embodiments to disclose techniques for applying, such as training and using, an action sequence decoder for generating action sequence (or sequence of actions) from recordings. It is another object of some embodiments to disclose techniques for style-transfer-based process for applying the action sequence decoder. It is yet another objective of some embodiments to disclose a robot configured to execute a task based on a recording. It is an objective of the present disclosure to disclose a trained action sequence decoder that converts audio-visual features and instruction speech to a sequence of actions called dynamic movement primitives (DMPs). The present disclosure further discloses style-transfer-based process that employs multi-task learning with video captioning and weakly-supervised learning with a semantic classifier to exploit unpaired video-action data.

It is an object of the present disclosure to use text data and/or text style associated with audio and/or video recordings to generate sequence of actions to be performed by a robot. In particular, the present disclosure may disclose techniques to utilize textual data, such as video captions, subtitles and/or speech transcriptions, that may share a same context in a semantic space corresponding to an audio and/or a video in the recording to generate action sequences for controlling the robot.

In an example, the present disclosure is configured to disclose techniques for applying the neural network including the action sequence decoder for generating the sequence of actions or an action sequence. For example, at first, the neural network and/or the action sequence decoder may be applied for training, such as on a recording. During the training, the neural network and/or the action sequence decoder may be applied to generate a sequence of actions from the recording. Further, once trained, the neural network and/or the action sequence decoder may be applied for implementation, such as on a video recording. During the implementation, the neural network and/or the action sequence decoder may be applied to generate an action sequence from the video recording.

FIG. 1A shows a block diagram of an exemplary network environment 100 for controlling a robot 102 to perform an operation, in accordance with an embodiment of the present disclosure. In an example, a system 104 is configured to control the robot 102 based on a set of human instructions 106 demonstrating an operation. The set of human instructions may be provided as a video recording. The system 104 includes a trained neural network 112 that is configured to generate instructions and/or signals for controlling the robot 102 to perform the operation.

In an embodiment, the system 104 is configured to acquire the set of human instructions 106 from a server or a database, such as database of a creator creating a video demonstrating the set of human instructions 106, an online platform hosting the video, etc.

In another embodiment, the system 104 is connected to a live video of a human demonstrating the operation and providing the corresponding set of human instructions 106. Further, the system 104 is configured to extract feature data 108 for the demonstrated operation and the human instructions 106. In an example, the feature data 108 may include features relating to each instruction from the set of instructions 106. In an example, the set of instructions 106 may be in form of a video. In such a case, the feature data 108 may include, for example, textual features, audio features, and image features corresponding to each image frame of the video.

In an example, the neural network 112 may have a transformer-based architecture. The transformer-based architecture of the neural network 112 employs a self-attention layer to facilitate the understanding, generation, and manipulation of sequential data. In an example, the self-attention layers of the neural network 112 may be configured to adaptively weigh and process different elements within a sequence of data, such as within the set of human instructions 106. This may enable a more comprehensive understanding of context and relationships within the data. The architecture of the neural network 112 may include multiple layers of transformers, each comprising encoder (such as an encoder 110) and decoder (such as an action sequence decoder 114) components. The encoder 110 processes input sequences, such as the set of human instructions 106, while the action sequence decoder 114 generates output sequences, such as an action sequence 116. The self-attention mechanism allows the neural network 112 to weigh the importance of different elements within the set of human instructions 106 dynamically, enabling enhanced contextual understanding. Moreover, multi-head attention in the transformer-based neural network 112 may be used to capture diverse relationships between elements in the set of human instructions 106.

The feature data 108 of the set of human instructions 106 is fed to the trained neural network 112. Pursuant to the present example, the neural network 112 is applied for implementation to generate an action sequence. In particular, the trained encoder 110 of the trained neural network 112 is configured to encode the feature data 108. Further, the encoded feature data may be fed to the trained action sequence decoder 114. The action sequence decoder 114 is applied for implementation to generate the action sequence 116 corresponding to the set of human instructions 106. In particular, the action sequence 116 may include dynamic movement primitives (DMPs) for the robot 102 such that performing the action sequence 116 causes the robot 102 to perform the operation that is being demonstrated by the set of human instructions 106.

In an example, the DMPs are fundamental, pre-defined motion patterns or behaviors that can be combined to create more complex movements for robotic systems. For example, the DMPs serve as building blocks for robot control, allowing robots to perform a wide range of tasks by composing and sequencing these basic motions. In an example, each action of the action sequence 116 may further include one or more DMPs (or skills) that simplifies control, planning and execution of the action by the robot 102. For example, a movement primitive associated with an action to be performed by the robot 102 may represent simple and well-defined movement that the robot 102 can execute. To this end, to accomplish the operation demonstrated through the human instructions 106, the robot 102 may have to combine multiple DMPs. By sequencing and combining the basic DMPs of the action sequence 116, the robot 102 may be able to perform intricate movements to carry out the operation. For example, for an operation relating to assembling a puzzle, DMPs of the action sequence may relate to, for example, picking up pieces, rotating them, and placing them, where these DMPs are parameterized over puzzle type, etc. Moreover, the DMPs may also be used to generate trajectories that specify the robot's path through space and time. For example, trajectories may define how the robot 102 should move its joints or end effector to achieve a desired motion or perform an action from the action sequence 116. To this end, a combination of multiple DMPs may create a trajectory that represents the entire operation performed by the robot 102.

In an example, the basic movements defined by the DMPs can include, but is not limited to, movement towards right, movement towards left, moving upwards, moving downwards, any other form of reaching movement, grasping, lifting, rotating, or any other basic motion relevant to the robot's action. For example, the movement primitive may be parameterized, such that the movement primitive can be adjusted and scaled to adapt to different situations, objects, or tasks. For example, a reaching movement primitive may have parameters for target position, orientation, and speed. To this end, the action sequence decoder 114 is configured to produce the action sequence 116 such that action sequence 116 has a semantic meaning similar to a semantic meaning of the human instructions 106, i.e., semantically related. Further, one or more actions in the action sequence 116 can be broken down into one or more DMPs that may ensure robotic execution of corresponding action to carry out the operation demonstrated in the human instructions 106 reliably.

FIG. 1B illustrates a mapping between human instructions 118 and an action sequence 120 for controlling the robot 102, in accordance with an embodiment. Pursuant to the present example, the human instructions 118 may relate to performing an operation or a task, such as a cleaning operation, a cooking operation, a factory operation, an assembly operation, an industrial task etc. For example, the human instructions 118 may be given as a video, such that various video and/or audio cues may be processed in order to identify the instructions for performing the operation. In the present example, the human instructions 118 may include three steps, such as three steps for performing a cooking task or an assembly task in an industry. As shown, the three steps of the human instructions 118 correspond to a first instruction 118$a$, a second instruction 118$b$, and a third instruction 118$c$.

In the context of robot manipulation and control, converting visual instructions from videos into actionable steps, i.e., action sequences for robots, is a fundamental challenge. A central concern is the emergence of mismatches, wherein intended semantic meaning of video instructions, such as the human instructions 118 are not faithfully captured in resultant action sequence 120. As shown, the action sequence 120 comprises a sequence of seven actions, namely, first action 120$a$, second action 120$b$, third action 120$c$, fourth action 120$d$, fifth action 120$e$, sixth action 120$f$ and seventh action 120$g$.

To this end, use of conventional techniques for converting the human instructions 118 into the action sequence 12 may have misalignment in a mapping between the steps described in the human instructions 118 and the action sequence 120. This misalignment may occur due to failure to capture semantic meaning of human instructions in the generated actions for the robot 102. Further, understanding a context of the human instructions 118 and interactions between objects in the scenes of the human instructions 118 is vital for generating meaningful DMPs.

In an example, the human instructions 118 may not be faithfully captured in resultant action sequence 120 as the mapping between the human instructions 118 and the actions sequence 120 may be incorrect. To this end, visual information, gestures, and contextual cues within the human instructions 118 are subject to interpretation, often resulting in the dilution of semantic significance. As a result, a human instruction from the human instructions 118 may not be correctly mapped with an action from the action sequence 120, or in some cases may not be mapped with any action in a generated action sequence. Such mismatch between human instructions 118 and the action sequence 120 results in failure of robot to carry out an operation demonstrated in the video.

In an embodiment, the human instructions 118 may relate to a factory-automation process involving assembly of components of an entity. In such a case, the human instructions 118 may include the first instruction 118$a$ as 'take component A', the second instruction 118$b$ as 'insert red-marked end of the component A into component B', the third instruction 118$c$ as 'invert the component A'. It may be noted that such steps of the human instructions 118 are only exemplary. Further, the action sequence 120 may include the first action 120$a$ as 'open a gripper', the second action 120$b$ as 'pick up the component A', the third action 120$c$ as 'move arm to a specific position', the fourth action 120$d$ as 'lower the gripper', the fifth action 120$e$ as 'lower the arm', the sixth action 120$f$ as 'insert component A into component B' and seventh action 120g as 'release components'. Further, the human instructions 118 may be mapped to the action sequence 120.

In an example, the generated action sequence 120 may be incorrectly mapped or generated due to loss of semantic meaning of the human instructions 118 in the transformation to the action sequence 120. For example, if the robot inserts the wrong end or side of the component A inside the component B, then the assembly between the component A and the component B may not form or the assembly may not be solidly built and reliable. To this end, the assembly comprising the component A and the component B, that may be formed by the robot, may not have desired stress capacity or load capacity, resulting in faulty product, wastage of material and cost.

In an example, occurrence of these mismatches stems from multifaceted origins. One significant factor is the inherent complexity of human actions themselves. Human instructions 118 may rely on language and gestures and may be inherently nuanced, leading to a gap between comprehensive visual and linguistic information encapsulated in the video corresponding to the human instructions 118 and simplified representation of these human instructions 118 as the action sequence 120.

The present disclosure addresses the challenge of accurately translating human instructions, such as provided in a form of video, into sequenced actions, by addressing loss of semantic meaning during this mapping process.

FIG. 1C illustrates a block diagram of an exemplary network environment 130 for applying the neural network 112 to control a robot, such as the robot 102, in accordance with an embodiment of the disclosure. In this regard, the network environment 130 comprises the system 104 for controlling the robot 102 according to a task. In particular, the system 104 comprises the action sequence decoder 114 of the neural network 112 that is applied to be trained to generate action sequences for controlling the robot 102. In an example, the neural network 112 is a transformer-based neural network.

In accordance with an example embodiment, the system 104 may include suitable logic, circuitry, interfaces, and/or code that may be configured to acquire a plurality of recordings 132 from a server computer. For example, the plurality of recordings 132 are acquired to acquire human common knowledge of task-oriented action sequences. The recordings 132 may include human demonstration of one or more tasks. In particular, the recordings 132 may be visual tools that teach viewers how to perform one or multiple tasks. In one example, a task may be associated with cooking a dish. In another example, another task may be associated with an assembly process for manufacturing. In yet another example, another task may be associated with a day-to-day activity, such as a search operation, a cleaning operation, etc.

In operation, the system 104 is configured to train the neural network 112 including the action sequence decoder 114. The action sequence decoder 114 is configured for generating an action sequence for the robot 102 to perform a task. The applying is based on the plurality of recordings 132 demonstrating one or multiple humans performing one or multiple tasks. In particular, the embodiments of the present disclosure are described with reference to applying the action sequence decoder 114 using a recording from the plurality of recordings 132. However, this should not be construed as a limitation. For example, in some embodiments, the action sequence decoder 114 may be trained on each of the plurality of recordings 132 sequentially or parallelly.

Continuing further, the system 104 is configured to collect a recording of the plurality of recordings 132 and a sequence of captions 140 (referred to as, caption 140, hereinafter) describing scenes in a recording. In an example, the recording may demonstrate performance of a task, such as a cooking task. Further, the recording may have multiple scenes. For example, different scenes of the recording may correspond to different image frames of the recording and/or different actions being performed in the recording. In an example, different scenes may include interactions between a human and one or more objects, or amongst the one or more objects to perform the task. Further, the captions 140 may describe the scenes of the recording in textual manner.

The system 104 is configured to extract feature data 134 from the recording. For example, the feature data 134 may include features of a video signal, an audio signal, and/or text transcription capturing the performance of the task. According to an example embodiment, audio-visual information of the recording may form the audio signal and the visual signal. Moreover, textual description, such as captions 140 or subtitles of the audio-visual information may form the text transcription. It may be noted that the text transcription may be speech transcription of the audio-visual information that may include instructions in natural language. For example, the text transcription may convey the same information as audio information and/or visual information of the recording. Thus, motive or information of the audio-visual signal may align with the text transcription.

The system 104 is further configured to encode the extracted feature data 134 to produce a sequence of encoded features of the recording. In one example, the system 104 may utilize the neural network 112 to encode the extracted feature data 134. In an example, the neural network model 112 may have a transformer based neural network architecture that transforms an input sequence of vectors, such as the extracted feature data 134, into an output sequence by passing it through a series of encoder. In this regard, the system 104 is further configured to pass the extracted feature data 134 through the encoder 110 to produce the sequence of encoded features.

In an example, the extracted feature data 134 may be encoded with a video encoder, an audio encoder and/or a text encoder to produce the sequence of encoded features. For example, the audio signal may be fed to the audio encoder, the video signal may be fed to the video encoder and the text transcription may be fed to the text encoder. Then, the audio encoder, the video encoder and the text encoder may be configured to output an output sequence of encoded audio features, video features and text features, respectively. This is illustrated in detail later in conjunction with FIG. 4, FIG. 5, and FIG. 6.

The system 104 is further configured to apply the action sequence decoder 114 to train the action sequence decoder 114. The action sequence decoder 114 is trained to produce a sequence of actions 136 for the robot 102 based on the sequence of encoded features. The sequence of actions 136 may be produced such that a semantic meaning of the sequence of actions 136 corresponds to a semantic meaning of the captions 140 describing scenes in the recording. In an example, the sequence of actions 136 is aligned with the sequence of captions 140 of the recording to have a one-to-one correspondence between the sequence of actions 136 and the captions 140.

In this regard, the system 104 and/or the neural network 112 may include a semantic classifier 138. For example, the semantic classifier 138 may be configured to provide a semantic mapping between an action from the sequence of actions 136 and a corresponding caption. In certain cases, a single caption may be semantically mapped to multiple actions. Alternatively, a single action may be semantically mapped to multiple sentences of the sequence of captions 140. To this end, based on input from the semantic classifier 138, the action sequence decoder 114 may be trained to accurately convert the sequence of captions 140 into the sequence of actions 136 such that semantic meaning of the sequence of captions 140 is retained within the semantic meaning of the sequence of actions 136.

In an example, applying the neural network 112 for training follows a two-stage process. First, the neural network 112, or the action sequence decoder 114 is trained to predict segment timestamps for the recording. Then the neural network 112, or the action sequence decoder 114 is trained to generate action sequence for controlling a robot. Pursuant to embodiments of the present disclosure, the action sequence decoder 114 is trained using a style-transfer-based learning, i.e., the machine learning comprises the style-transfer-based learning. In this regard, the style-transfer-based learning converts sentence styles, i.e., text style, of available text transcriptions and/or subtitles or captions 140 to action-sequence style while preserving the semantic meaning of the sequence of captions 140 of the recording. For example, when the action sequence decoder 114 is applied, the action sequence decoder 114 may be trained to process the sequence of encoded features using a multi-task loss. The multi-task loss may be based on a comparison of the sequence of encoded features of the recording with ground truth sequence of captions 140 of the recording. In an example, the action sequence decoder 114 may use a cross-entropy (CE) loss as a factor for determining a difference between the sequence of encoded features and ground truth sequence of captions 140 relating to the recording. Details of applying the action sequence decoder 114 for training are described in conjunction with, for example, FIG. 3, FIG. 4, and FIG. 5.

To this end, the present disclosure provides an automatic, efficient, and fast way of applying the neural network 112 for training using the plurality of recordings 132. The present disclosure provides a method to train the action sequence decoder 114 for generating an action sequence or the sequence of actions 136 to be executed by the robot 102 according to the task to be performed.

Further, the system 104 may be configured to command the robot 102 to execute the sequence of actions 136. For example, the sequence of actions 136 may be transmitted to the robot 102 in an iterative manner to cause the robot 102 to perform the task demonstrated in the recording.

FIG. 1D illustrates a mapping between human instructions and action sequences based on semantic meaning, in accordance with an embodiment of the present disclosure. Pursuant to embodiments of the present disclosure, the human instructions 142 may be extracted from a video demonstrating an operation. Moreover, once trained, the neural network 112 or the action sequence decoder 114 may be applied to produce the action sequence 144. The action sequence 144 has a semantic meaning similar to a sematic meaning of the human instructions 142.

The present disclosure pertains to methods and systems for generating the action sequence 144 for robotic systems, ensuring semantic alignment with provided video human instructions 142. The technology enables the translation of video-based human instructions 142 into precise and coherent actions 144 executable by robotic entities, such as the robot 102. The semantic alignment provides the advantage of shared common knowledge to the robot 102, which is inherent in humans and helps in accurate and faster interpretation of similar human instructions.

Some embodiments are based on the realization that semantic alignment helps to bridge a gap between human communication and robotic execution by retaining a semantic intent embedded in the human instructions 142 in the generated action sequence 144. The method involves a multi-stage process that extracts linguistic and visual cues from a video of the human instructions 142, interprets their combined semantic meaning, and translates this understanding into executable action sequence 144 for the robot 102. Further, an embodiment of the present disclosure describes a robust semantic selecting and mapping framework 141. This selecting and mapping framework 141 leverages output from the semantic classifier 138 indicating similarity of semantic matching between the human instructions 142 and the action sequence 144. The selecting and mapping framework 141 accurately maps human instructions 142 with actions of the action sequence 144 to produce a semantic mapping to ensure reliable operation of the robot 102.

In an example, the action sequence decoder 114 identifies gestures, facial expressions, and contextual cues in the video, while simultaneously extracting linguistic elements from spoken or textual data or captions. Once these cues are extracted, the semantic mapping process takes place. This involves aligning the extracted cues to generate a comprehensive understanding of the intended instruction. In an example, the trained action sequence decoder 114 then maps this semantic understanding onto a predefined action space for the robot 102 to produce the action sequence 144, ensuring that the generated action sequence 144 accurately represents the original human instructions 142.

Pursuant to present example, the human instructions 142 may include three set of instructions, namely, a first instruction 142a, a second instruction 142b, and a third instruction 142c. Moreover, based on semantic decoding or semantic understanding of the human instructions 142, the actions sequence decoder 114 may map the human instructions 142 to the action sequence 144, comprising, a first action 144a, a second action 144b, a third action 144c, a fourth action 144d, a fifth action 144e, a sixth action 144f, a seventh action 144g, eight action 144h, ninth action 144i, and tenth action 144j. For example, the human instructions 142 may be similar to the human instructions 118. To this end, the human instructions 142 may include the first instruction 142a as take component A', the second instruction 142b as 'insert red-marked end of the component A into component B', the third instruction 142c as 'invert the component A'.

Further, the action sequence 144 may include the first action 144a as 'move an arm of a robot to the left', the second action 144b as 'open a gripper', the third action 144c as 'lower the gripper', the fourth action 144d as 'pick up the component A from blue end', the fifth action 144e as 'raise the arm' the sixth action 144f as 'move arm to the right to a specific position', the seventh action 144g as 'lower the gripper', the eighth action 144h as 'lower the arm', the ninth action 144i as 'insert red end of component A into component B' and tenth action 144j as 'grip the component A and rotate by 180 degrees'. Further, the human instructions 142 may be mapped to the action sequence 144.

To this end, the action sequence 144 is now generated such that semantic meaning of the human instructions 142 is embedded. To this end, the semantic meanings of the human instructions 142 may be mapped to the sematic meanings of the action sequence 144 using the selecting and mapping framework 141. For example, the selecting and mapping framework 141 may include the neural network 112 to generate the action sequence 144 that is semantically mapped to the human instructions 142.

FIG. 2 shows a block diagram of the system 104 for controlling the robot 102, according to some embodiments of the disclosure. The system 104 includes an input interface 200 configured to receive input data indicative of the task to be performed by the robot 102. The input data may be used to control the robot 102 from a start pose to a goal pose to perform the task. In this regard, the input interface 200 may be configured to accept a recording for performing the task. The new recording may include various operations to be performed by the robot 102 in order to execute or carry out the task, and an output for the robot 102 that may be indicative of completion of the task. In some embodiments, the input interface 200 is configured to receive input data indicative of video and audio signals along with text transcriptions, i.e., a sequence of caption indicative of human demonstration of the task. For example, the input data corresponds to multi-modal information, such as audio, video, textual, natural language, or the like. In certain case, the input data may include sensor-based video information received or sensed by visual sensors, sensor-based audio information received or sensed by audio sensors and, or a natural language instruction received or sensed by language sensors. The input data may be raw measurements received from the sensors or any derivative of the measurements, representing the audio, video and/or textual information and signals corresponding to the recording.

In one embodiment, the robot 102 is a set of components, such as arms, feet, and end-tool, linked by joints. In an example, the joints may be revolutionary joints, sliding joints, or other types of joints. The collection of joints determines degrees of freedom for the corresponding component. In an example, the arms may have five to six joints allowing for five to six degrees of freedom. In an example, the end-tool may be a parallel-jaw gripper. For example, the parallel-jaw gripper has two parallel fingers whose distance can be adjusted relative to one another. Many other end-tools may be used instead, for example, an end-tool having a welding tip. The joints may be adjusted to achieve desired configurations for the components. A desired configuration may relate to a desired position in Euclidean space, or desired values in joint space. The joints may also be commanded or controlled by the system 104 in the temporal domain to achieve a desired (angular) velocity and/or an (angular) acceleration. The joints may have embedded sensors, which may report a corresponding state of the joint. The reported state may be, for example, a value of an angle, a value of current, a value of velocity, a value of torque, a value of acceleration, or any combination thereof. The reported collection of joint states is referred to as the state. In some embodiments, the robot 102 may include a motor or a plurality of motors configured to move the joints to change the motion of the arms, the end-tool and/or the feet according to a command produced by the system 104.

Returning to the system 104, the system 104 may have a number of interfaces connecting the system 104 with other systems and devices. For example, the system 104 is connected, through a bus 201, to a server computer 210 to acquire the recordings 132 via the input interface 200. Additionally, or alternatively, in some implementations, the system 104 includes a human machine interface (HMI) 202 that connects a processor 205 to a keyboard 203 and a pointing device 204, wherein the pointing device 204 may include a mouse, trackball, touchpad, joystick, pointing stick, stylus, or touchscreen, among others. Additionally, the system 104 includes a controller 209. The controller 209 is configured to operate the motor(s) of the robot 102 to change the placement of the arms, the end-tool and/or the feet according to a sequence of actions for the robot 102. For example, the sequence of actions for the robot 102 is received by the controller 209 via the bus 201, from the processor 205. In an example, the bus 201 is a dedicated data cable. In another example, the bus 201 is an Ethernet cable. For example, the robot 102 may be commanded or controlled by the controller 209 to perform, for example, a cooking task, based on a recording received by the processor 205 via the input interface 200 and the sequence of actions 136 determined by the processor 205 by applying the neural network 112. For example, the sequence of actions to perform the cooking task may form part of a set of task descriptions or commands sent to the robot 102.

It may be noted that references to a robot, without the classifications "physical", "real", or "real-world", may mean a physical entity or a physical robot, or a robot simulator which aims to faithfully simulate the behavior of the physical robot. A robot simulator is a program consisting of a collection of algorithms based on mathematical formulas to simulate a real-world robot's kinematics and dynamics. In an embodiment, the robot simulator also simulates the controller 209. The robot simulator may generate data for 2D or 3D visualization of the robot 102.

The system 104 includes the processor 205 configured to execute stored instructions, as well as a memory 206 that stores instructions that are executable by the processor 205. The processor 205 may be a single core processor, a multi-core processor, a computing cluster, or any number of other configurations.

The memory 206 may include random access memory (RAM), read only memory (ROM), flash memory, or any other suitable memory systems. The processor 205 is connected through the bus 201 to one or more input interfaces and the other devices. In an embodiment, the memory 206 is embodied within the processor 205 and may additionally store the neural network 112. The neural network 112 may in turn embody the encoder 110 and the action sequence decoder 114 in an exemplar implementation.

The system 104 may also include a storage device 207 adapted to store different modules storing executable instructions for the processor 205. The storage device 207 may also store a computer program 208 for producing training data indicative of recording, testing recordings, validation recordings, action sequences and/or action labels relating to tasks that the robot 102 may have to perform. The storage device 207 may be implemented using a hard drive, an optical drive, a thumb drive, an array of drives, or any combinations thereof. The processor 205 is configured to determine a control law for controlling the motor(s) of the robot 102 based on the sequence of skills to move the arms, the end-tool, and/or the feet according to the controls and execute the self-exploration program 208 that performs the task demonstrated in the recordings 132.

The system 104 may be configured to control or command the robot 102 to perform a task, such as a cooking task from an initial state of the robot 102 to a target or end state of the robot 102 by following a sequence of actions. The sequence of actions may include or may be broken down into various short-horizon steps or action labels, that may be considered as abstract representations for robot actions or dynamic movement primitives (DMPs) for the robot 102. A manner in which the system 104, specifically, the neural network 112, is trained to produce a sequence of actions for performing a task based on a recording and control the robot to perform the task is described in detail, hereinafter.

FIG. 3 illustrates a flowchart 300 of an example method for applying the neural network 112 for training, in accordance with an embodiment of the present disclosure. The neural network 112 is trained such that scene-aware interaction framework is extended to human-robot collaboration to achieve task-oriented goals.

Typically, humans share knowledge using natural language, an abstract-level representation, and humans can understand each other because they share similar experiences. Subsequently, human students can achieve goals by mimicking teacher actions or manipulating target objects differently as long as they can get the same exact status as the teacher's results.

Such human knowledge of performing a task needs to be taught to a robot to enable the robot to perform the task. To teach human common knowledge to robots, scene-understanding technologies may be applied to task-oriented planning using human recordings 132. In particular, the neural network 112 that controls the robot 102 is trained using the plurality of recordings 132 demonstrating one or more tasks performed by one or more humans. In particular, human instructors may demonstrate and explain steps of one or more tasks using speech and/or actions in audio-visual scenes of the recordings 132.

In an example, to acquire human common knowledge of task-oriented action sequences from the human recordings, dataset containing egocentric recordings with simple short descriptions, such as a sequence of captions may be used. The neural network 112, particularly, the action sequence decoder 114 may be applied or trained to output a sequence of actions as verb/noun class sequences. A manner in which the neural network 112 and the action sequence decoder 114 are applied for training is described below.

At 302, a recording of the plurality of recordings 132 may be collected. Moreover, a sequence of captions describing scenes in the recording may also be collected. For example, the recording and the sequence of captions may be collected from the server computer 210. In an example, the recording for training may be an untrimmed instructional video. For example, the recording may be taken as an input via the input interface 200.

At 304, the recording may be segmented. In an example, dense video captioning techniques may be used to segment a given long-form video, i.e., the recording, into smaller clips, i.e., a sequence of digital image frames. The sequence of digital image frames may capture information indicative of a human demonstration for performing the task in different scenes. In particular, the dense video captioning techniques may be utilized to simultaneously segment the recording corresponding to the scenes and associate captions with the segmented frames based on associated scenes. For example, the sequence of digital image frames of the recording may be associated with the sequence of captions based on timestamps.

At 306, feature data may be extracted from the recording. In an example, feature data may be extracted from each of the sequence of frames having associated captions of the recording. For example, the feature data for a frame may include features of a video signal, an audio signal, and text transcription corresponding to the scene or the digital frame of the recording. In this manner, feature data indicating video signals, audio signals, and text transcriptions may be extracted for the recording. Such feature data may capture the performance of the task by a human in the recording. In an example, the features of the video signal may include, but is not limited to, color features, shape features, texture features, motion features, edge features, object descriptors, depth features, audio features, face features, temporal features, and statistical features. Moreover, the features of the audio signal may include, but is not limited to, spectral features, temporal features, rhythm and timing features, pitch features, frequency features, and bandwidth. In addition, the features of the text transcription may include, but is not limited to, syntax-based features, semantic features, word embeddings, topic modeling features, sentiment features, readability features, statistical features, syntactic tree features, and bag of words (BoW) features.

In one example, features of the visual or video signals may be extracted using a vision model, for example, an Omnivore model. The vision model may be applied for different visual modalities for, for example, recognition of images, video and/or 3D or depth data. For example, image feature data for the sequence of digital image frames may be extracted using, for example, a Contrastive Language Image Pre-Training (CLIP) model. In an example, features of video and image of the sequence of digital image frames may be concatenated and projected as a single video signal. Further, the audio signals for the sequence of digital frames of the recording may be extracted using, for example, an Audio Spectrogram Transformer (AST) model. In an example, features of audio of the sequence of digital image frames may be concatenated and projected as a single audio signal. Further, when the recording or the sequence of digital frames has associated sequence of captions, i.e., text transcriptions or subtitles are available for the recording, the text transcriptions may be extracted using global vectors for word representation, such as, Glo Ve word embedding. For example, a number of dimensions of the audio signal, video signal, and text transcriptions may be 768 bits, 1024 bits, and 300 bits, respectively.

At 308, the extracted feature data may be encoded. In an example, the extracted feature data of the recording may be fed to the neural network 112. Further, the encoder 110 may be configured to encode the extracted feature data. In this regard, the encoder 110 may include a video encoder, an audio encoder, and a text encoder. In particular, the video signal may be fed to the video encoder, the audio signal may be fed to the audio encoder, and the text transcriptions may be fed to the text encoder. For example, using the different encoders corresponding to different modalities, i.e., the video encoder, the audio encoder, and the text encoder, different modalities of feature data of the recording may be encoded. The encoder 110, i.e., the video encoder, the audio encoder, and the text encoder, may be configured to produce a sequence of encoded features.

In an example, the video encoder may encode the video signal by using temporal and spatial redundancies present in video content, i.e., the video signal. To this end, the video encoder may encode only the information that may be necessary to represent changes between, for example, the sequence of digital frames. For example, the video encoder may employ various compression techniques to minimize data during encoding while maintaining visual quality.

In a similar manner, the audio encoder may encode audio signals corresponding to the sequence of digital frames. For example, the audio encoder may transform the audio signals into frequency domain, quantize the frequency-domain signals and encode the quantized signals. In an example, the audio encoder may utilize predictive techniques to reduce an amount of data required to represent the audio signal of the recording while maintaining its perceptual quality.

Further, the text encoder may encode textual transcriptions of the sequence of digital frames of the recording to convert textual information (words, sentences, paragraphs, etc.) into numerical representations that machine learning models can understand and process. For example, the text encoder may be configured to capture word relationships in the text transcriptions as well as contextual information across sentences of the text transcriptions in the produced encoded features. In this regard, the text encoder may learn to represent words of the text transcriptions as numerical vectors in a way that captures semantic relationships between words based on their context in the text transcriptions of the recording. To this end, the output of the video encoder, the audio encoder and the text encoder may be concatenated as the sequence of encoded features corresponding to the recording.

In accordance with an embodiment, a transformer-based architecture of the neural network 112 that may include the audio encoder, the video encoder and the text encoder may have two or more attention layers. For example, the attention layers may enable the encoders to capture long-range dependencies and relationships between words, videos, and audios in a sequence, which is important for understanding nuances of human language. In an example, dimensions of multi-head attention layers of the audio encoder and the video encoder may be given by:

$$d\,(V)\,\text{model} = d(A)\,\text{model} = 768$$

and dimensions of multi-head attention layers of the text encoder may be given by:

$$d\,(T)\,\text{model} = 300$$

Further, in an example, dimensions of feed-forward layers of the audio encoder, the video encoder and the text encoder may be set as:

$$d_{ff}^{(*)} = 4 \times d_{model}^{(*)}$$

where $$d_{model}^{(D)} = 300.$$

At 310, the action sequence decoder 114 of the neural network 112 is applied for training. In this regard, the action sequence decoder 114 is trained for producing a sequence of actions for the robot 102 such that a semantic meaning of the sequence of actions is same as a semantic meaning of the recording. In this regard, the sequence of encoded features of the recording may be processed with the action sequence decoder 114. In an example, the action sequence decoder 114 may be trained with machine learning. In an example, the machine learning comprises a style-transfer-based process.

In an example, the neural network 112 may have a transformer model, such that the neural network 112 may have a series of encoder and decoder layers. As described above, the encoders, such as the video encoder, the audio encoder, and the text encoder of the neural network 112 are configured to produce the sequence of encoded features by breaking down the video signal, the audio signal, and the text transcriptions, respectively, into tokens, understand meaning of the tokens within the context of the recording and produce meaningful representations as the sequence of encoded features. Further, the decoder, such as the action sequence decoder 114 of the neural network 112 is configured to perform a reverse process of the encoders, i.e., take the compressed data (i.e., the sequence of encoded features), reconstruct the feature data (i.e., the video signal, the audio signal and the text transcriptions) and produce the sequence of actions 136 that can be performed by the robot 102.

According to an example embodiment, the applying of the action sequence decoder 114 on the sequence of encoded features for training comprises computing a multi-task loss based on a comparison of a semantic meaning of the sequence of actions with a semantic meaning of ground truth sequence of captions 140 describing scenes in the recording. The ground truth sequence of captions 140 may be targeted for training and/or validating the action sequence decoder 114 with labeled dataset. For example, the multi-task loss comprises a combination of an action sequence loss factor, a video caption loss factor, and a semantic classification loss factor. For example, the action sequence loss factor and/or the video caption loss factor comprises a cross-entropy (CE) loss, and the semantic classification loss factor comprises a binary cross-entropy (BCE) loss. The CE loss and the BCE loss may be used as a loss function when optimizing or re-training the action sequence decoder 114 during its training.

In an example, the action sequence decoder 114 may be trained based on optimization of the multi-task loss. For example, the action sequence decoder 114 may be configured to generate the sequence of actions 136 that is semantically similar to the ground truth sequence of captions 140, subtitles and/or the text transcriptions of the recording.

Further, by optimizing the multi-task loss based on comparison of decoding of the semantic meaning of the sequence of actions with the semantic meaning of the sequence of captions, the action sequence decoder 114 may be trained. To this end, the semantic classification loss factor is based on a comparison of the semantic meaning of the sequence of actions 136 with the semantic meaning of the ground truth sequence of captions 140. A manner in which the action sequence decoder 114 is applied for training using the recording is described in detail in conjunction with, for example, FIG. 4.

FIG. 4 shows a block diagram 400 of the neural network 112, in accordance with an example embodiment. The neural network 112 may correspond to a transformer-based neural network. The transformer-based neural network 112 may include encoders, such as the encoder 110 and decoders, such as the action sequence decoder 114 for carrying out its operations.

In this regard, when applying the neural network 112 during training, the plurality of recordings 132 may be obtained. It may be noted that one or more human experts may share their knowledge of how to perform one or more task through multi-modal instructions in their demonstrations, showing a sequence of short-horizon steps to achieve long-horizon goals of completing the one or more tasks in the recordings 132. The plurality of recordings 132 may have associated ground truth sequence of captions 140, that may be used for training.

Further, feature data is extracted from a recording of the recordings 132. In an example, from the recording, video feature data or features of a video signal 402, image feature data or features of an image signal 404, audio feature data or features of an audio signal 406 and/or text data or features of text transcriptions 408 may be extracted. For example, the features of the video signal 402 may indicate visual information relating to a sequence of digital frames of the recording, the features of the image signal 404 may also indicate visual information relating to the sequence of digital frames of the recording. Further, the features of the audio signal 406 may indicate audio, speech or natural language speech information relating to the sequence of digital frames of the recording. Moreover, the features of the text transcriptions 408 may indicate natural language text or speech transcription information relating to the sequence of digital frames of the recording.

In an example, the recording may include audio-visual scenes that may be used to generate descriptions of the recording, such as subtitles. The neural network 112 may be configured to convert long-form descriptions in the recording into short scenes, such as sequence of digital frames, using a clip segmentor 410. To this end, the neural network 112 may be trained using dense video captioning. In this regard, the neural network 112 may be configured to simultaneously segment the long form recording into smaller sequence of digital frames using the clip segmentor 410 and caption each digital frame. For example, for captioning each digital frame, audio to text or speech transcription techniques may be used.

In an example, the segmented digital frames along with associated audio segments may be fed to an audio-visual encoder (E) 412. In particular, the features of the video signal 402, the features of the image signal 404 and the features of the audio signal 406 may be fed to the audio-visual encoder (E) 412 simultaneously. For example, the features of the video signal 402 and the features of the image signal 404 may be concatenated to represent visual feature data of the recording. In an example, the audio-visual encoder 412 may combine both audio and visual feature data or features of the audio, video, and image signals to learn meaningful representations from the recording with accompanying audio. The audio-visual encoder 412 may be configured to capture relationships and interactions between the audio signals 406 and visual modality, i.e., the video signals 402 and the image signals 404. In this regard, the features (e.g., audio waveform or spectrogram) of the audio signal 406 may be processed by an audio encoder. Similarly, the features (e.g., video frames or optical flow) of the video or visual signal 402 and 404 may be processed by a video encoder. Examples of the audio encoder may include, but are not limited to, a convolutional neural network (CNN) or a recurrent neural network (RNN) designed to capture audio features. Further, examples of the video encoder may include, but are not limited to, CNNs to extract visual features from the frames or features of the video and image signals.

Continuing further, for example, the audio-visual encoder 412 may enable cross-modal interactions between the encoded audio features and the video features. Such interactions may be achieved through, for example, attention mechanisms. For example, attention mechanism may be used to compute how much attention should be given to the encoded audio features when processing encoded video features of each visual frame and vice versa. This may enable the neural network 112 to learn to focus on relevant audio-visual pairs at each time step. For example, during the applying, the audio-visual encoder 412 may also be trained by optimizing parameters of the audio and video encoders to minimize a difference between predicted outcomes, i.e., the sequence of encoded features for the audio and video signals of the recording, and ground truth encoding features for the recording.

In an example, the audio-visual encoder (E) 412 has self-attention layers for each of a plurality of modalities, such as video, image, and audio. Moreover, the self-attention layers correspond to cross-attention layers across the plurality of modalities to encode audio signals 406 and visual features, i.e., video signals 402 and image signals 404, extracted from the recording.

Pursuant to embodiments of the present disclosure, the neural network 112 is extended with the text encoder 414. The text encoder 416 accepts text transcriptions 408 extracted from the speech transcription of the recording as input. In an example, the text transcriptions 408 for the recording may be provided by a speech recognizer. For example, the text transcriptions 408 may include direct instructions in natural language. Some embodiments of the present disclosure are based on an understanding that the text transcriptions 408 of the recording may improve quality of output action sequences for controlling the robot 102. In addition, the text encoder 414 is configured to encode the text transcriptions 408. In an example, the text encoder 414 may be configured to produce word embeddings of the text transcriptions 408, such that semantic and contextual meaning of the text is retained. Such word embeddings may form the encoded features along with the encoded video and audio features. Such encoded features may be fed to the action sequence decoder (D') 114.

The action sequence decoder (D') 114 is configured to process the sequence of encoded features of the recording to produce the sequence of actions 136 corresponding to the task. In an example, the sequence of actions 136 may include action labels that may correspond to actions of the robot 102. For example, each of the action labels may include a single verb plus a few noun objects, where the verbs and the nouns are represented with their class categories. These action labels may be considered abstract representations for robot actions movements or skills. It may be noted, the sequence of actions 136 may be a sequence of robot actions called the dynamic movement primitives (DMPs).

In an example, the sequence of encoded features may also be fed to a caption decoder (D) 416. In particular, the caption decoder 416 may be an auto-regressive transformer decoder. The caption decoder 416 may be configured to generate words for forming captions by attending the audio and visual (video and/or image) encoding features and text transcription encoding features. For example, the caption decoder 416 may produce a sequence of training captions for the sequence of encoded features of the sequence of digital frames of the recording. To this end, recording not having captions can also be used for controlling the robot for performing tasks. The accuracy of the caption decoder 416 may be optimized by comparing the generated captions with the ground truth sequence of captions 140 corresponding to the recording.

Mathematically, given the recording, V, the neural network 112, f, or the caption decoder 416 may be applied for training to produce $f(V)=\{\hat{c}_1, \hat{c}_2, \ldots, \hat{c}_m\}$, where $\hat{c}_i$ is a natural language caption for a digital frame $\hat{s}_i$ of the recording defined by onset and offset timestamps. In this manner, subtitles, or captions for each of the sequence of digital frames of the recording may be predicted. The evaluation of dense video captioning follows a standard segment-matching natural language evaluation metrics. In particular, the prediction of the natural language captions for the sequence of the digital frames may be compared with ground truth sequence of captions 140 using metrics, such as BLEU score and METEOR.

In an example, the neural network 112 may also include a proposal generator 418. The proposal generator 418 may include 1-D time-convolution modules that may scan audio-visual encoding features to detect digital frames to be captioned. In an example, the proposal generator 418, once trained, may provide feedback to the clip segmentor 410 that segments the recording into sequence of digital frames to identify which digital frames need to be captioned, i.e., which digital frames have actions occurring.

In particular, the application of the neural network 112 for training follows a two-stage process. In the first stage, the neural network 112, specifically, the caption decoder 416, is fed with sequence of encoded features of the recording. In this stage, the caption decoder 416 is configured to produce natural language captions, i.e., text data or speech transcription for the sequence of digital frames of the recording.

In the second stage, the neural network 112, specifically, the proposal generator 418, is fed with the entire recording. In this stage, the proposal generator 418 is trained to predict timestamps corresponding to the sequence of digital frames that are to be captioned, i.e., segmentize the recording to identify frames to be captioned. It may be noted that the caption decoder 416 and the proposal generator 418 in the two stages of applying the neural network 112 may share the audio-visual encoder 412.

According to an example embodiment, the proposal generator 418 may not be used to segmentize frames for captioning. In other words, ground truth sequence of digital frames of the recording may be used to focus the applying of the neural network 112 on generation of the sequence of actions 136 corresponding to the task demonstrated in the recording using only audio-video cues. In this regard, the action sequence decoder (D') 114 of the neural network 112 may be trained to generate the sequence of actions 136 corresponding to the demonstrated task without captions or with fewer captions in limited frames.

After the caption decoder 416 and the proposal generator 418 are trained, at first, the proposal generator 418 may be used to segmentize the recording into shorter sequence of digital frames. Thereafter, non-maximal suppression may be applied on the sequence of digital frames to get rid of parts of digital frames that overlap and/or complete digital frames that overlap for a large portion. Once the suppressed sequence of digital frames is generated, the generated sequence of suppressed digital frames may be inputted to the caption decoder 416 to generate captions or speech transcription corresponding to the digital frames. Further, the action sequence decoder 114 may be trained to generate an action sequence or the sequence of action 114 that may have a semantic meaning similar to a semantic meaning of the captions, video and/or audio of the recording. For example, the action sequence decoder 114 is trained to generate the action sequence instead of natural language instructions so that the robot 102 may be controlled properly in a scene-aware manner to execute the task. Additional details of applying the action sequence decoder 114 to generate the action sequence are described in conjunction with, for example, FIG. 5.

FIG. 5 shows a block diagram 500 of the neural network 114 for applying the action sequence decoder 114 for training, in accordance with an embodiment of the present disclosure. The action sequence decoder 114 may be trained and configured to produce an action sequence or a sequence of actions. An action in the action sequence may be a short-horizon step that may be executed by the robot 102 to perform a part or a step of the task. In an example, a single action may be generated corresponding to each digital frame from the sequence of digital frames of the recording. Additionally, or alternatively, a single action may be generated corresponding to a set of digital frames from the sequence of digital frames.

In an example, the short-horizon step of the action may be a verb/noun class sequence. For example, the action may include a single verb (i.e., a single action) along with a few (such as two or three) noun objects that may have to interact for performing the verb. Some examples of actions forming an action sequence may include, but are not limited to, "place celery in a bowl", "turn-on tap", "wash celery under the tap", "turn-off tap", and "put celery in a pan". It may be noted that the verbs and the nouns in each action may be represented with their class categories. These actions may be considered as abstract representations or short description for robot actions.

In an example, the neural network 112, specifically, the action sequence decoder 114 may be trained using a style-transfer approach to generate a sequence of actions corresponding to the sequence of digital frames of the recording. In this regard, the style-transfer approach is used to convert sentence style of available video captions, text data, speech transcription and/or subtitles of the recording to the action sequence style while preserving the semantic content of the text transcriptions.

In order to perform the style-transfer learning for the action sequence decoder 114, at first, multi-task learning may be applied. As described above, the audio-visual encoder 412 may encode audio-visual signals, and the text encoder 414 may encode the text transcriptions 408 to generate the sequence of encoded features.

Continuing further, the sequence of encoded features may be fed to the caption decoder 416 and the action sequence decoder 114. The caption decoder 416 may be applied to produce a sequence of training captions for the sequence of encoded features corresponding to the audio signal 406, the video signal 402, the image signals 404 and/or the text transcriptions 408. In an example, the caption decoder 416 may also be applied for training for video captioning as an auxiliary task. Further, the action sequence decoder 114 may be applied for training to generate an action sequence from the recording.

It may be noted that a number of recordings having well-designed action labels or action sequences that may be suitable for training of the neural network 112 is very limited. Therefore, to mitigate low resource problems of labeled data for action steps and utilize a large number of videos for training, a style-transfer approach on video caption data may be used for applying the action sequence decoder 114. The video caption data may describe the corresponding video. In this regard, the style-transfer learning may be used to convert sentence style of available video caption data (i.e., captions, subtitles, and/or speech transcription) of videos to action sequence style while preserving the semantic content.

By using the style-transfer based approach for the action sequence decoder 114, action sequences may be generated from general recordings, i.e., videos lacking captions or subtitles or action labels. In an example, for style-transfer based learning of the action sequence decoder 114, multi-task learning and weakly-supervised learning may be applied. In an example, the multi-task learning uses action sequence generation from the action sequence decoder 114 as a first task or a primary task, and video captioning from the caption decoder 416 as a second task or an auxiliary task. In this manner, two decoders, i.e., the caption decoder 416 and the action sequence decoder 114, may be trained for two-style outputs, i.e., sentence style (or natural language-based output) and action sequence style (or robot dynamic movement primitive-based output). The two decoders are trained on top of the shared multi-modal encoder, i.e., the audio-visual encoder 412 and the text encoder 414.

Further, the weakly-supervised learning may be applied using a semantic classifier (S) 138 that judges whether the generated action sequence is semantically equivalent to ground truth sequence of captions 140, or not. For example, the semantic classifier 138 is a pre-trained classifier that is configured to generate a semantic similarity. In particular, for style-transfer based learning process for the action sequence decoder 114, the weakly-supervised training process may be implemented using the semantic classifier 138. The semantic classifier 138 is configured to take the generated sequence of actions produced by the action sequence decoder 114 and the sequence of training captions produced by the caption decoder 416. Further, the sematic classifier 138 is configured to produce a probability that the two sequences, i.e., the sequence of actions and the captions, are semantically the same. For example, the semantic classifier 138 may use its output as a weak label for feedback to the action sequence decoder 114 and the caption decoder 416. In this manner, the style-transfer-based learning process for the action sequence decoder 114 used a weakly-supervised training process.

To this end, the sequence of encoded features may be processed with the action sequence decoder 114 to produce the sequence of actions 136 for the robot 102. Moreover, the sequence of encoded features may be processed with the caption decoder 416 to produce the sequence of training captions for the recording. Thereafter, the sequence of actions 136 and the sequence of training captions may be classified by the semantic classifier 138. In particular, the semantic classifier 138 may classify the sequence of actions 136 to produce a sequence of semantic labels for the sequence of actions 136. For example, the sequence of semantic labels for the sequence of actions 136 may indicate semantic meaning of the sequence of actions 136. In addition, the semantic classifier 138 may classify the sequence of training captions to produce a sequence of semantic labels for the sequence of training captions. For example, the sequence of semantic labels for the sequence of training captions may indicate semantic meaning of the sequence of training captions.

Further, when applying the neural network 112 for training, parameters of the action sequence decoder 114, the caption decoder 416, and the semantic classifier 138 may be updated to reduce differences between the sequence of semantic labels for the sequence of actions 136 and the sequence of semantic labels for the sequence of training captions. In this manner, the neural network 112, or the action sequence decoder 114 is applied for training to produce the sequence of actions 136 that is semantically similar to the sequence of training captions generated by the caption decoder 416. For example, the caption decoder 416 may be used when ground truth sequence of captions 140 for a recording may not be available.

However, in certain cases, the ground truth sequence of captions 140 is available for the recording. In such a case, the semantic classifier 138 may classify the sequence of captions 140 corresponding to the recording to produce a sequence of semantic labels for the sequence of captions 140. Further, by applying or re-applying the action sequence decoder 114 for training, parameters of the action sequence decoder 114 may be updated to reduce differences between the sequence of semantic labels for the sequence of actions 136 and the sequence of semantic labels for the sequence of captions 140.

In an example, based on the classification of the sequence of actions 136, the sequence of captions 140 and/or the sequence of training captions generated by the caption decoder 416, the semantic classifier 138 is configured to generate multi-task loss factors. Further, applying the action sequence decoder 114 for training to produce the sequence of actions 136 for the robot 102 may be optimized based on the multi-task loss.

In an example, when the recording is annotated with the sequence of captions 140, the action sequence decoder 114 may be applied to generate the sequence of actions 136. Further, a semantic classification loss factor 504 may be generated based on the sequence of semantic labels for the sequence of actions 136 and the sequence of semantic labels for the sequence of captions 140. In an example, the semantic classification loss factor 504 may be a binary cross-entropy (BCE) loss generated based on a comparison between the sequence of semantic labels for the sequence of actions 136 with the sequence of semantic labels for the sequence of captions 140, i.e., based on a difference in a semantic meaning of the sequence of actions 136 and a semantic meaning of the ground truth sequence of captions 140.

Embodiments of the present disclosure may utilize multi-task learning and the weakly supervised learning for applying the action sequence decoder 114 to learn to generate the action sequences having semantic meaning similar to corresponding captions. Furthermore, utilizing speech transcription or text data for generating action sequences without audio-visual features may enable action sequence generation in a spontaneous manner, for example, as humans do on phone without cameras.

During the training, the input recordings 132 may be either labeled having annotations of sequence of captions 140, or may have captions generated by, for example, the caption decoder 416. For example, when the recording is annotated with the sequence of captions 140 (or ground truth sequence of captions 140) and ground truth sequence of actions 506, the action sequence decoder 114 may be applied to generate the sequence of actions 136. Further, an action sequence loss factor 508 may be generated. In an example, the action sequence loss factor 508 may be a cross-entropy (CE) loss generated based on a comparison between the generated sequence of actions 136 with the ground truth sequence of actions 506. For example, the ground truth sequence of actions 506 may indicate actual action sequence for carrying out the task associated with the recording.

Further, when the recording is annotated with the sequence of captions 140, such as a speech transcription or natural language sentences, then the caption decoder 416 may be applied to generate a sequence of training captions, i.e., words or natural language sentences by attending the audio, visual and textual encoding features. Further, for the caption decoder 416, a video caption loss factor 502 may be generated. In an example, the video caption loss factor 502 may be a cross-entropy (CE) loss generated based on a comparison between the semantic labels for sequence of training captions generated by the caption decoder 416 and the semantic labels for the ground truth sequence of captions 140. For example, the ground truth sequence of captions 140 may indicate actual natural language instructions associated with the recording.

In an example, a multi-task loss may be calculated for the multi-task learning. The multi-task loss may be calculated based on the video caption loss factor 502, the action sequence loss factor 508 and the semantic classification loss factor 504. In one example, the multi-task loss may be calculated as:

$$L_{mt} = CE\,(D(h),\,c) + CE\,(D'(h),\,c') \qquad (1)$$

$$h = (E(x_A,\,x_v),\,T(x_T)) \qquad (2)$$

where c is ground truth sequence of captions 140 and c' is the ground truth sequence of actions 506. Moreover, h denotes set of audio, visual, and text encodings or sequence of encoded features generated by the audio-visual encoder (E) 412 and the text encoder (T) 414 from corresponding feature data indicated by $x_A$, $x_v$, and $x_T$. For example, if c or c' does not exist for the input recording, then CE loss corresponding to video caption loss factor 502 and/or the action sequence loss factor 508 may not be computed for missing ground truth sequence of captions 140 and/or ground truth sequence of actions 506.

For example, the video caption loss factor 502 and/or the action sequence loss factor 508 may be back propagated to the caption decoder 416 and the action sequence decoder 114, respectively. In addition, adjusted weights, or updated parameters of the caption decoder 416 and the action sequence decoder 114 may be further back propagated to the encoder 110, i.e., the audio-visual encoder 412 and the text encoder 414. In this way, the shared encoders, i.e., the audio-visual encoder 412 and the text encoder 414 may be trained using more data, and action-sequence-style sentences may be generated from various kinds of video recordings not limited to egocentric videos.

Moreover, weakly-supervised learning may also be applied to the neural network 112 that relies on the semantic classifier 138 to provide weak labels for applying the action sequence decoder 114 for training. During the training, if the input recording does not have an annotation of the ground truth sequence of actions 506 but has a sequence of training captions generated by the caption decoder 416, then the semantic classifier 138 may be configured to predict whether or not sequence of actions generated by the action sequence decoder 114 using the sequence of training captions is semantically the same as the ground truth sequence of captions 140. This allows to train the action sequence decoder 114 to generate a semantically similar sequence of actions to the sequence of training captions without action labels for the recording.

For example, during training a weakly-supervised loss is computed for the semantic classifier 138. The weakly-supervised loss may be computed as:

$$L_{weak} = \sum\nolimits_{y' \sim D'(y|h)} BCE\,(S\,(y',\,c),\,1) \qquad (3)$$

where y' is sampled from the action sequence decoder (D') 114 and the semantic classifier 138 generates a probability based on similarity between y' and c in terms of semantic content. In an example, the semantic classification loss factor 504 may be calculated. For example, the semantic classification loss factor 504 may be a binary cross entropy (BCE) loss. The BCE loss may be computed based on the semantic classifier output of semantic labels for the sequence of actions 136 and the semantic labels for the sequence of captions 140.

To perform the backpropagation for updating parameters, continuous approximation may be applied to the decoding process, where y' may be sampled to make y' differentiable. In an example, the semantic classifier 138 is separately pre-trained with positive and negative caption samples $c^+$ and $c^-$ to minimize the BCE loss. The semantic classification loss factor 504 or BCE loss may be computed as:

$$L_{weak} = BCE(S\,(y,\,c^+),\,1) + BCE\,(S\,(y,\,c^-),\,0) \qquad (4)$$

where paired captions and action sequences (y, c+) may be used and negative samples $c^-$ are randomly selected from the dataset. For example, when the action sequence decoder 114 is updated using $L_{weak}$, then parameters of the semantic classifier 138 may be frozen.

In this manner, the neural network 112, specifically, the shared encoders 110 (audio-visual encoder 412 and text encoder 412) and the two decoders (the caption decoder 416 and the action sequence decoder 114) may be trained to generate a sequence of captions for a recording and a sequence of actions from the sequence of captions such that the sequence of actions is semantically consistent with the audio-visual information of the recording.

In an example, the recordings 132 may include videos without speech transcripts, i.e., without text data or captions. This trains the neural network 112 using ordinary videos that may be available over the Internet. The neural network 112 is trained to generate captions, using the caption decoder 416, and utilize the generated captions to generate actions sequences, using the action sequence decoder 114. Further, if robots had similar kinematics to humans, the robots could mimic human actions by following the trajectory of these actions in a straightforward manner. However, robots typically have very different kinematics, and it is thus difficult in practice to transfer a wide variety of human actions to robot actions by just mimicking them. To this end, to transfer common knowledge to the neural network 112, the neural network 112 is trained to apply scene-understanding technologies to task-oriented planning using the human recordings 132.

In addition, the generated actions sequence or sequence of actions are in the form of short-horizon steps. For example, each action may include a single verb plus a few noun objects, e.g., a 5-step action sequence "turn-on tap", "take celery", "wash celery", "turn-off tap", "put celery in pan," where the verbs and the nouns are represented with their class categories. These actions may be considered as abstract representations for general robot actions. Such short-horizon steps may enable to generate skills or dynamic movement primitives (DMPs) for the robot 102 that may be performed accurately by the robot 102. As a result, occurrences of failure of robot to perform a set of operations based on semantic understanding may be substantially reduced.

A manner in which the system 104 including the neural network 112 is used to control the robot 102 is described in detail in conjunction with, for example, FIG. 6, FIG. 7, and FIG. 8.

FIG. 6 illustrates a block diagram 600 for generating an action sequence using a video recording 602, in accordance with an embodiment of the present disclosure. In an example, the neural network 112, particularly, the action sequence decoder 114 may be trained to generate action sequences, such as the sequence of actions 136 using the recordings 132. The neural network 112 may be trained to understand human common knowledge by recognizing and understanding robot surroundings based on various types of sensors.

Once trained, the system 104 including the neural network 112 may be used to control the robot 102. In this regard, the system 104 may acquire the video recording 602 and a set of captions describing scenes in the video recording 602 for performing an operation. In an example, the video recording 602 may be acquired from a server computer. To this end, audio-visual scenes of the video recording 602 may include a human instructor demonstrating the operation that needs to be done using speech and visual demonstration. In an example, the system 104 and/or the processor 205 of the system 104 may be communicatively coupled to the server computer 210.

Further, the system 104 or the processor 205 may be configured to process the video recording 602 and the set of captions using or by applying the trained action sequence decoder 114 to produce a set of actions for the robot 102. In this regard, the processor 205 may be configured to segment the acquired video recording 602 into a sequence of frames. Each frame from the sequence of frames may capture information indicative of a human demonstration for performing the operation. In an example, the sequence of frames of the video recording 602 may be segmented or partitioned based on a certain characteristic, such as time, boundaries, motion, color, texture, or other visual features. In one example, the sequence of frames includes a step-by-step audio-video representation of the human demonstration for performing the operation.

Once segmented, the processor 205 may be configured to extract feature data for the sequence of frames. The feature data may include, for example, video feature data 604, image feature data 606, audio feature data 608, and text feature data 610. In an example, the text feature data 610 may be related to speech transcription of the video recording 602. For example, the text feature data 610 may be generated based on speech transcription of the video recording 602. In an example, the text feature data 610 may be generated based on the set of captions of the video recording 602. In another example, the text feature data 610 may be generated based on set of captions generated by applying the trained caption decoder 416 of the neural network 112. An example of utilizing the set of captions generated by the caption decoder 416 is explained in detail in conjunction with, for example, FIG. 7.

Thereafter, the generated feature data may be encoded. In an example, audio-visual feature data, such as the video feature data 604, the image feature data 606 and the audio feature data 608 may be fed to the trained audio-visual encoder 412. Moreover, the text feature data 610 may be fed to the trained text encoder 414. For example, the trained audio-visual encoder 412 and the text encoder 414 may generate embeddings 612 of the audio-visual feature data and embeddings 614 (hereinafter referred to as embeddings 612 and 614) of the text feature data 610, respectively. Such embeddings 612 and 614 may be utilized by a decoder, specifically, the trained action sequence decoder 114 to generate output.

In an example, the audio-visual encoder 412 may include self-attention layers corresponding to a plurality of modalities and cross-attention layers across the plurality of modalities to encode the audio-visual features, such as the video feature data 604, the image feature data 606 and the audio feature data 608.

In an example, the embeddings 612 and 614 of the feature data of the video recording 602 may be processed by the action sequence decoder 114 to transform the encoded features into an action sequence selected from a set of predetermined actions of the robot 102. For example, the set of predetermined actions of the robot 102 may include or may be described as DMPs associated with a predefined number of verbs (or actions) and nouns (or objects to be manipulated). In other words, each action from the set of predetermined actions may include one or more DMPs that the robot 102 may be capable of performing. In an example, a DMP may be a probabilistic function of a state of the robot 102 returning an action, or a distribution over actions in response to submitting a current state. For example, the DMPs in the actions are sub-sequences, sub-tasks, or sub-actions for performing the task. In addition, each DMP may be a state/action pair or a sequence of state/action pairs in time domain. To that end, a DMP can be a single-step DMP or a multi-step DMP. For example, the DMP corresponding to the state/action pair can be coined as single-step DMP and the DMP corresponding to a sequence of state/action pair can be coined as multi-step DMP. Further, the action sequence decoder 114 may be configured to process the encoded feature data to produce the action sequence that may be performed by the robot 102 in order to perform the operation demonstrated in the video recording 602. In an example, each action of the action sequence is represented as a single-step or a multi-step DMP.

For example, the action sequence decoder 114 may process the embeddings 612 and 614 of the feature data. In an example, the action sequence decoder 114 includes a multi-mode attention. In an example, the neural network 112 may be configured to repeat computations of the encoders (i.e., the audio-visual encoder 412 and the text encoder 414) and the decoder (i.e., the action sequence decoder 114) multiple times, where each of these computations are referred to as an attention head. The neural network 112 may be configured to split query, key, and value parameters and pass each split independently through a separate attention head to generate its computation. For example, each computation in each head may generate an independent output. The outputs may be combined together to produce a final attention score for the feature data of each of the sequence of frames of the video recording 602. In this manner, the transformer-based neural network 112 having attention architecture may be applied to encode multiple relationships and nuances for each word of the speech transcription or caption and/or action demonstrated in the recording, and subsequently produce the action sequence corresponding to the operation performed in the video recording 602.

In an example, the DMPs of the generated action sequence may be selected from a library of pre-defined DMPs for the robot 102. Some embodiments are based on recognition that the DMPs stored in the library of pre-defined DMPs are elementary DMPs such as move options, rotate options, stop option, pick option, place option, and the like. To that end, the library of pre-defined DMPs includes the DMPs such as move to left, move to right, move to XYZ direction, move up, move down, stop, place object, pick object, rotate tool, and the like. In some embodiments, the DMPs stored in the library of pre-defined DMPs may be composed of two or more elementary DMPs leading to a complex DMP. For instance, the complex DMP may include elementary skills such as "move to XYZ direction" and "place object". Some embodiments are based on the realization that there exist multiple libraries of pre-defined DMPs to execute one task or multiple tasks. For instance, when a task demands skills from multiple libraries, DMPs stored in the multiple libraries of pre-defined DMPs may be accessed and desired DMPs may be selected. In some other embodiments, there may be a requirement to learn a new DMP to execute some task demonstrations. To that end, the learned new DMP can be stored in the existing library of pre-defined DMPs or a new library of pre-defined DMPs may be created to store the learned new DMP.

Further, a DMP may be stored as a probabilistic function. To that end, the DMP in is the probabilistic function of a state of the robot 102 returning an action, or a distribution over actions in response to submitting the current state. Hence, mathematically, the DMP may be defined as:

$$\pi_{DMP}(s) \to a \stackrel{def}{=} \pi_{DMP}(a \mid s)$$

Therefore, the DMP can be mathematically represented as $\pi_{move\_to\_left}$, $\pi_{move\_to\_right}$ and the like. To this end, the action sequence generated by the action sequence decoder 114 can be easily implemented by the robot 104 owing to having actions in form of DMPs and the actions implemented by the robot 102 is semantically similar to the human demonstrations.

Further, the system 104 may be configured to control the robot 102 based on the produced action sequence to perform the operation. For example, the controller 209 may be configured to control the robot based on the produced action sequence to execute a set of actions corresponding to the execution of the operation. For example, the controller 209 and/or the processor 205 of the system 104 may be configured to generate control signals to cause the robot 102 to move based on the action sequence to perform the operation. In this manner, the robot 102 may be controlled to execute the operation based on the video recording 602, specifically the human demonstration of the operation and the speech transcription or set of captions of the video recording. In an example, the system 104 is configured to store instructions to cause the robot 102 to execute a DMP of an action using each control step or control signal.

FIG. 7 illustrates a flowchart 700 of an example method for controlling the robot 102 to execute the operation by generating a set of captions for the video recording 602, in accordance with an embodiment of the present disclosure. The steps of the FIG. 7 are explained in conjunction with elements of the FIG. 1A, FIG. 1B, FIG. 1C, FIG. 1D, FIG. 2, FIG. 3, FIG. 4, FIG. 5, and FIG. 6. For example, the system 104 having transformer-based neural network 112 may be configured to perform the steps of the FIG. 7.

At 702, the video recording 602 demonstrating the performance of the operation is acquired. Further, a sequence of frames capturing information indicative of a human demonstration for performing the operation is produced. In an example, the sequence of frames includes a step-by-step audio-video representation of the human demonstration for performing the operation. For example, the sequence of frames may be segmented from the video recording 602 based on timestamps and/or actions in the different frames.

At 704, feature data is extracted for the sequence of frames. In an example, the feature data may include the video feature data 604, the image feature data 606, the audio feature data 608, and the text feature data 610.

At 706, the extracted feature data is encoded. For example, the audio-visual feature data may be encoded using or by applying the trained audio-visual encoder 412 and the text feature data 610 may be encoded using or by applying the text encoder 414 to produce a sequence of encoded features.

At 708, the sequence of encoded features may be processed by applying the trained caption decoder 416 to produce a set of captions providing semantic description of different portions of the human demonstrations in the video recording 602. In an example, the trained caption decoder 416 may use speech transcription of the video recording 602 to generate the semantic set of captions. For example, the semantic set of captions may have semantic mapping between a human action being performed in a portion of the human demonstration or a frame in the video recording, objects manipulated in the portion or the frame and speech or text corresponding to the portion or the frame. Such semantic set of captions may help to describe or learn common knowledge to generate actions or DMPs for the robot 102.

At 710, the sequence of encoded features along with the set of captions may be processed by applying the trained action sequence decoder 114 for implementation. The trained action sequence decoder 114 is used to transform the sequence of encoded features and/or the set of captions into an action sequence. For example, the trained action sequence decoder 114 of the transformer-based neural network model 112 may produce the action sequence for the robot to cause the robot 102 to execute the operation. The action sequence is produced while enforcing each action of the action sequence to have a semantic meaning same as a semantic meaning of a corresponding caption from the set of captions of the demonstration. In other words, the actions for executing the operation may not be completely the same, however, the actions are semantically the same as the human demonstration of the operation in the video recording.

In an example, enforcing an action having a semantic meaning similar to a semantic meaning of a corresponding caption indicative of a portion of the human demonstration may enable the robot 102 to manipulate target objects differently as long as the robot 102 can get an exact same status or output as the human demonstration.

For example, for a cleaning task-based recording demonstrating how to clean a room using a cloth, the action sequence decoder 114 may learn to produce DMPs or actions for the robot 102 for cleaning the room using a vacuum cleaner. In this regard, the action sequence decoder 114 having attention layers and using self-attention may use semantic meaning of the set of captions of the video recording to identify places to clean. Further, the action sequence decoder 114 may identify the action sequence or DMPs for the robot 102 having semantic meaning similar to the semantic meaning of the portions of the human demonstrations, such that the target object, i.e., the vacuum cleaner, may be manipulated differently to achieve a same status, i.e., clean room. This enables greater flexibility in the execution of a task using different target objects.

At 712, the robot 102 is commanded or controlled to execute the action sequence.

FIG. 8A and FIG. 8B illustrate schematic diagrams 800 and 810, respectively, of execution of an operation by the robot 102, in accordance with an embodiment of the present disclosure. The steps of the FIG. 8A and FIG. 8B are explained in conjunction with elements of the FIG. 1A, FIG. 1B, FIG. 1C, FIG. 1D, FIG. 2, FIG. 3, FIG. 4, FIG. 5, FIG. 6, and FIG. 7.

In an example, the robot 102 may be configured to perform the operation, such as assembling an entity (as shown in FIG. 8A) or make a bowl of cereal (as shown in FIG. 8B). In this regard, the system 104 may acquire a video recording, such as the instructional video 602 comprising human demonstration on how to assemble the entity or make the bowl of cereal from a video camera 802. In certain other cases, the system 104 may acquire the instructional video 602 from a database or a server computer. For example, based on the instructional video 602, a sequence of frames may be generated. As may be understood, the sequence of frames may be captured by the video camera 802 at a specific rate, and when played in sequence, may create the instructional video 602. Each frame carries various parameters and characteristics that influence the overall quality and appearance of the video.

In an example, the instructional video 602 may include captions. In certain cases, machine-learning based platforms may be used for generating the captions for the instructional video 602.

Further, the feature data of the video recording 602 may be encoded to produce encoded features. For example, the encoded features may include encoded video feature data, audio feature data and text feature data that may indicate the human demonstration of the operation for, for example, assembling the entity or making the bowl of cereal. Further, the trained action sequence decoder 114 is applied for implementation to decompose the encoded features into an action sequence, such as a set of actions. In an example, each action is represented as a dynamic movement primitive (DMP). Further, the action sequence decoder 114 of the neural network 112 may be configured to produce the action sequence or the sequence of dynamic movement primitives for each sub-task demonstrated in the video recording 602. Each sub-task is completed by executing one or more DMPs.

In an example, the robot 102 may utilize sensors, such as RGB camera, voltage sensor, current sensor, etc. while carrying out the action sequence or the sequence of DMPs. The sensors may be used to detect the pose of objects, such as milk carton, bowl, cereal carton, components of the entity, tools, or machines, etc. during the execution of the operation.

For example, 804 and 812 show a human demonstration of assembling the entity and making a bowl of cereal, respectively. To this end, such human demonstration may be a part of one or more digital frames. For example, based on the human demonstration, feature data may be extracted from the digital frames. For example, audio, video, and textual feature data may be encoded to understand interaction and relationships between the objects and the human, as well as other properties of the interactions and relationships. Based on the encoded features, an action sequence of DMPs may be produced that could be implemented by the robot 102. For example, DMPs may be aligned to predefined set of actions, such as short-horizon action labels, that may include a predefined number of verbs or actions and a predefined number of nouns or objects. Based on the DMPs of the predefined set of actions, the action sequence for implementing the operation of "assemble the entity" or "make a bowl of cereal" may be implemented.

Referring to FIG. 8A, at 804, the human demonstration of assembling the entity may include demonstration of action steps for assembling components of the entity using machines, tools etc. In an example, a human demonstrating the operation of assembling the entity may have an audio description "insert component A into a cavity in the component B and fasten it using a screw". For example, based on the human demonstration of the operation, the produced action sequence may include actions, but is not limited to, 'move XYZ distance to right', 'lower arm, 'open gripper', 'pick component A', 'raise arm', 'move to ABC position', 'insert component A into cavity of component B', 'release component A', 'move to DEF position', 'lower arm', 'pick a fastener', 'raise arm', move to ABC position', insert fastener to form joint', etc.

As shown in 806, the robot 102 is controlled to perform DMPs to execute the operation of "assemble the entity". For example, each of the DMPs of the action sequence may be performed by the robot 102 by controlling actuators of the robot 102 using control signals corresponding to the action sequence or the DMPs.

Referring to FIG. 8B, at 812, the human demonstration of making a bowl of cereal may include demonstration of an action of pouring milk into a bowl 814. In an example, a human demonstrating the operation of making the bowl of cereal may have an audio description "add cereal to the bowl and add milk to the bowl". For example, based on the human demonstration of the operation, the produced action sequence may include actions, but is not limited to, "pick a bowl", "place the bowl on a table in upright position", "hold a cereal carton", "tilt the cereal carton", "move the cereal carton back and forth" "add cereal to the bowl until the bowl is one-third full", "put down the cereal carton on the table", "pick up a milk carton", "tilt the milk carton over the bowl", "pour milk from the milk carton in the bowl", "put down the milk carton on the table", "pick out a spoon", and "stir the cereal and milk in the bowl".

As shown in 816, the robot 102 is controlled to perform DMPs to execute the operation of "making a bowl of cereal". For example, each of the DMPs of the action sequence may be performed by the robot 102 by controlling actuators of the robot 102 using control signals corresponding to the action sequence or the DMPs.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure. Therefore, it is the object of the appended claims to cover all such variations and modifications as come within the true spirit and scope of the disclosure.

What is claimed is:

1. A computer-implemented method for applying a neural network including an action sequence decoder configured for generating a sequence of actions for a robot to perform a task, the neural network being applied to generate the sequence of actions based on a plurality of recordings demonstrating one or multiple humans performing one or multiple tasks, comprising:

collecting a recording of the plurality of recordings and a sequence of captions describing scenes in the recording;

extracting feature data from the recording, the feature data includes features of one or a combination of a video signal, an audio signal, and text transcription capturing a performance of the task;

encoding the extracted feature data with one or a combination of a video encoder, an audio encoder, and a text encoder to produce a sequence of encoded features; and applying the action sequence decoder to produce the sequence of actions for the robot based on the sequence of encoded features having a semantic meaning corresponding to a semantic meaning of the sequence of captions describing scenes in the recording, wherein the sequence of actions is aligned with the sequence of captions to have a one-to-one correspondence between the actions and the captions.

2. The computer-implemented method of claim 1, wherein applying the action sequence decoder further comprises:

processing the sequence of encoded features with the action sequence decoder to produce the sequence of actions for the robot;

classifying the sequence of actions with a semantic classifier to produce a sequence of semantic labels for the sequence of actions;

classifying the sequence of captions with the semantic classifier to produce a sequence of semantic labels for the sequence of captions; and updating parameters of the action sequence decoder to reduce differences between the sequence of semantic labels for the sequence of actions and the sequence of semantic labels for the sequence of captions.

3. The computer-implemented method of claim 1, wherein the neural network includes a caption decoder configured to produce the sequence of captions for the sequence of encoded features, and a semantic classifier configured to produce a sequence of semantic labels for its inputs, the applying further comprising:

processing the sequence of encoded features with the action sequence decoder to produce the sequence of actions for the robot;

processing the sequence of encoded features with the caption decoder to produce the sequence of captions for the recording;

classifying the sequence of actions with the semantic classifier to produce a sequence of semantic labels for the sequence of actions;

classifying the sequence of captions with the semantic classifier to produce a sequence of semantic labels for the sequence of captions; and updating parameters of the action sequence decoder, the caption decoder, and the semantic classifier to reduce differences between the sequence of semantic labels for the sequence of actions and the sequence of semantic labels for the sequence of captions.

4. The computer-implemented method of claim 1, wherein the neural network is a transformer-based neural network.

5. The computer-implemented method of claim 1, wherein the sequence of actions corresponds to a sequence of dynamic movement primitives (DMPs) to be executed by the robot.

6. The computer-implemented method of claim 1, wherein the method further comprises:

segmenting the recording into a sequence of digital frames capturing information indicative of a human demonstration for performing the task.

7. The computer-implemented method of claim 1, wherein applying the action sequence decoder further comprises:

processing the sequence of encoded features with the action sequence decoder of the neural network, the processing comprising computing a multi-task loss based on a comparison of the sequence of encoded features with the sequence of captions, wherein the multi-task loss comprises a combination of an action sequence loss factor, a video caption loss factor, and a semantic classification loss factor; and applying the action sequence decoder to produce the sequence of actions for the robot based on optimization of the multi-task loss.

8. The computer-implemented method of claim 7, wherein the action sequence decoder of the neural network includes an attention module trained with machine learning, and wherein the attention module includes a multi-mode attention.

9. The computer-implemented method of claim 7, wherein the action sequence loss factor comprises a cross-entropy (CE) loss.

10. The computer-implemented method of claim 7, wherein the video caption loss factor comprises a cross-entropy (CE) loss.

11. The computer-implemented method of claim 7, wherein the semantic classification loss factor comprises a binary cross-entropy (BCE) loss.

12. The computer-implemented method of claim 7, wherein the semantic classification loss factor is based on a comparison of decoding of action sequence data from the sequence of encoded features with the sequence of captions.

13. The computer-implemented method of claim 8, wherein, once the action sequence decoder is trained, the method further comprises:

acquiring a video recording and a set of captions describing scenes in the video recording for performing an operation;

processing the video recording and the set of captions using the trained action sequence decoder to produce an action sequence for the robot; and controlling the robot based on the produced action sequence to perform the operation.

14. The computer-implemented method of claim 1, wherein at least one of: the video encoder, or the audio encoder comprises self-attention layers corresponding to a plurality of modalities and cross-attention layers across the plurality of modalities to encode at least one of: the video signal and the audio signal.

15. The computer-implemented method of claim 1, wherein style-transfer-based process is used for applying the action sequence decoder to produce the sequence of actions, the style-transfer-based process comprising transforming the semantic meaning of the sequence of captions describing scenes in the recording to the semantic meaning of the sequence of actions.

16. The computer-implemented method of claim 15, wherein the style-transfer-based process is based on a multi-task learning process comprising at least a first task associated with applying the action sequence decoder to produce the sequence of actions and a second task associated with generation of the sequence of captions for the recording.

17. The computer-implemented method of claim 15, wherein the style-transfer-based process is a weakly-supervised training process.

18. A system for applying a neural network including an action sequence decoder configured for generating a sequence of actions for a robot to perform a task, the neural network being applied to generate the sequence of actions based on a plurality of recordings demonstrating one or multiple humans performing one or multiple tasks, the system comprising a processor; and a memory having instructions stored thereon that cause the processor of the system to:

collect a recording of the plurality of recordings and a sequence of captions describing scenes in the recording;

extract feature data from the recording, the feature data includes features of one or a combination of a video signal, an audio signal, and text transcription capturing a performance of the task;

encode the extracted feature data with one or a combination of a video encoder, an audio encoder, and a text encoder to produce a sequence of encoded features; and apply the action sequence decoder to produce the sequence of actions for the robot based on the sequence of encoded features having a semantic meaning corresponding to a semantic meaning of the sequence of captions describing scenes in the recording, wherein the sequence of actions is aligned with the sequence of captions to have a one-to-one correspondence between the actions and the captions.

19. A non-transitory computer-readable medium having stored thereon, computer-executable instructions that when executed by a system, causes a processor of the system to execute operations for applying a neural network including an action sequence decoder configured for generating a sequence of actions for a robot to perform a task, the neural network being applied to generate the sequence of actions based on a plurality of recordings demonstrating one or multiple humans performing one or multiple tasks, the operations comprising:

collecting a recording of the plurality of recordings and a sequence of captions describing scenes in the recording;

extracting feature data from the recording, the feature data includes features of one or a combination of a video signal, an audio signal, and text transcription capturing a performance of the task;

encoding the extracted feature data with one or a combination of a video encoder, an audio encoder, and a text encoder to produce a sequence of encoded features; and applying the action sequence decoder to produce the sequence of actions for the robot based on the sequence of encoded features having a semantic meaning corresponding to a semantic meaning of the sequence of captions describing scenes in the recording, wherein the sequence of actions is aligned with the sequence of captions to have a one-to-one correspondence between the actions and the captions.

* * * * *